United States Patent [19]

Armitage et al.

[11] Patent Number: 4,718,153
[45] Date of Patent: Jan. 12, 1988

[54] CUSHION MANUFACTURING PROCESS

[75] Inventors: Donald H. Armitage, Grand Rapids; Robert C. Angell, Spring Lake, both of Mich.

[73] Assignee: Steelcase Inc., Grand Rapids, Mich.

[21] Appl. No.: 850,292

[22] Filed: Apr. 10, 1986

[51] Int. Cl.$^4$ .............................................. B68G 7/00
[52] U.S. Cl. .................................... 29/91.1; 29/91; 156/72; 156/79; 156/90; 297/455; 297/458; 297/460
[58] Field of Search .............. 29/91.1, 91, 91.7, 91.8; 297/452, 455, 457, 458, 460, DIG. 2; 156/72, 79, 196, 214, 216, 212, 219, 242, 245, 206, 224, 90

[56] References Cited

U.S. PATENT DOCUMENTS

| | | | |
|---|---|---|---|
| 3,068,138 | 12/1962 | Friedman | 29/91.1 |
| 3,090,154 | 5/1963 | Harris | 29/91.1 |
| 3,211,600 | 10/1965 | Motycka | 156/214 |
| 3,249,984 | 5/1966 | Storti | 29/91.1 |
| 3,258,511 | 6/1966 | McGregor, Jr. | 29/91.1 |
| 3,503,838 | 3/1970 | Marshack | 29/91.1 |
| 3,829,343 | 8/1974 | Remmert | 156/322 |
| 3,906,134 | 9/1975 | Pohl | 428/206 |
| 3,932,252 | 1/1976 | Woods | 156/245 |
| 4,046,611 | 9/1977 | Sanson | 156/79 |
| 4,089,919 | 5/1978 | Sanson | 264/46.6 |
| 4,107,829 | 8/1978 | Urai et al. | 29/91.1 |
| 4,114,213 | 9/1978 | Beernaerts et al. | 5/345 |
| 4,116,736 | 9/1978 | Sanson et al. | 156/79 |
| 4,131,664 | 12/1978 | Flowers et al. | 264/510 |

FOREIGN PATENT DOCUMENTS 3029875 3/1981 Fed. Rep. of Germany .......... 29/91
1427619 3/1975 United Kingdom .

Primary Examiner—Howard N. Goldberg
Assistant Examiner—Irene Graves Golabi
Attorney, Agent, or Firm—Price, Heneveld, Cooper, DeWitt & Litton

[57] ABSTRACT

A process for molding upholstered chair cushions comprising placing a sheet of upholstery fabric between two dies, one having sculptured effects thereon, the dies being movable toward each other to form a cavity between them. A cushion assembly having a thickness (with the upholstery) greater than the distances between the dies in the cavity is placed in the cavity after having been coated on at least one side adjacent the upholstery with an air permeable adhesive. The dies are urged together to compress the cushion in the cavity to force the fabric and the cushion to conform to the shape of the first die. Hot vapors are injected into the cavity to shape the cushion and the fabric generally to the sculpted configuration of the sculpted die.

45 Claims, 41 Drawing Figures

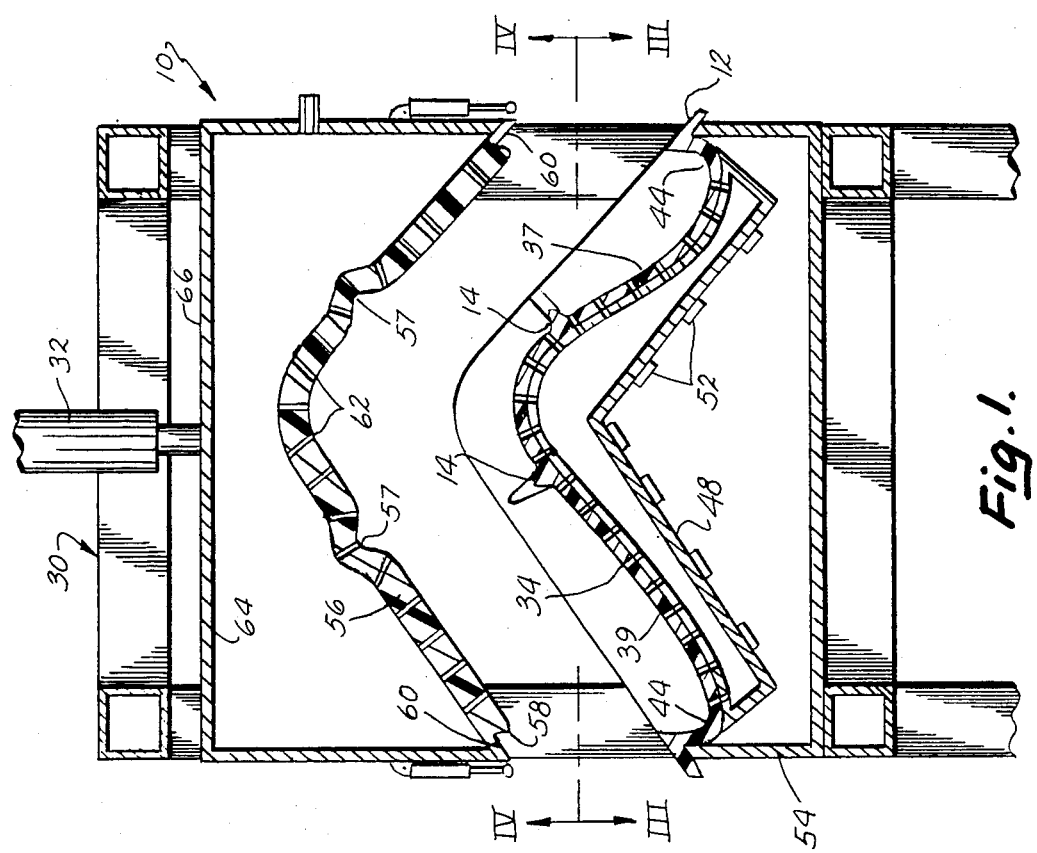
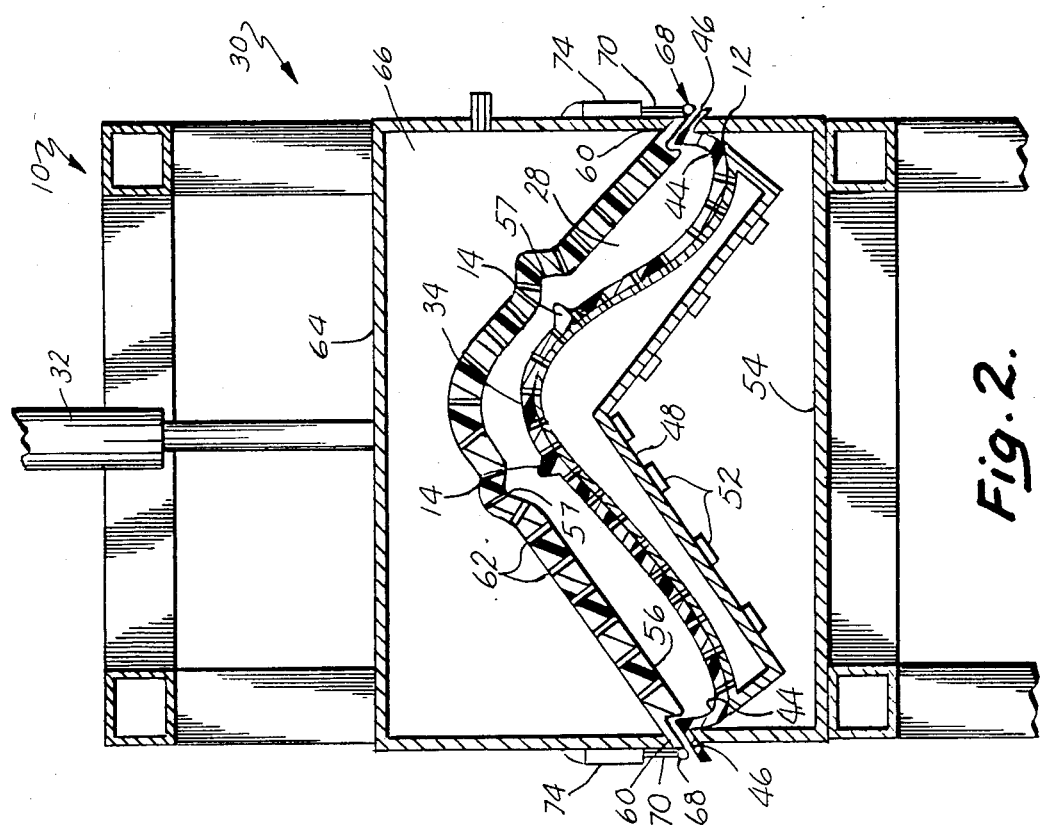

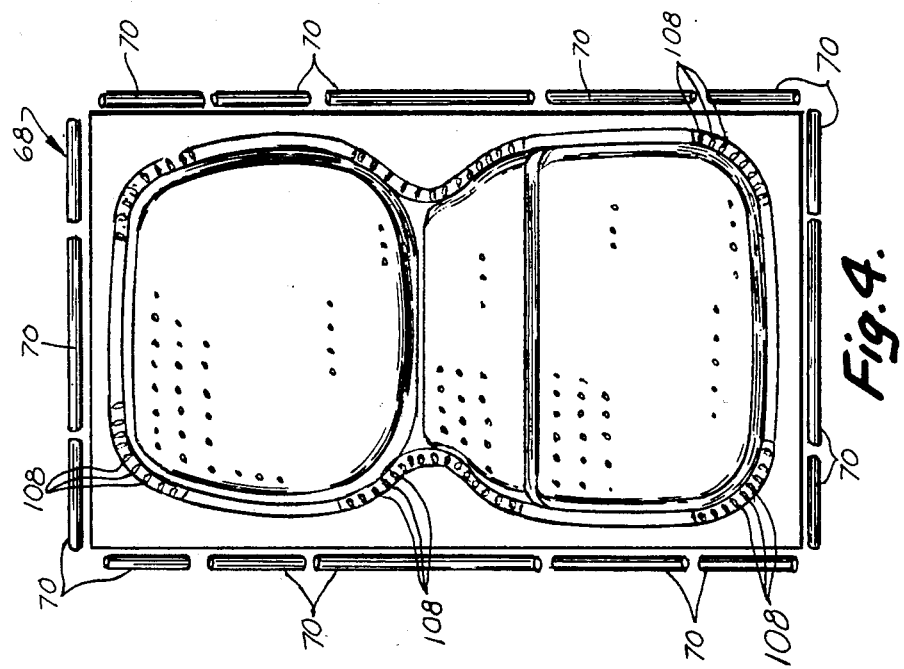
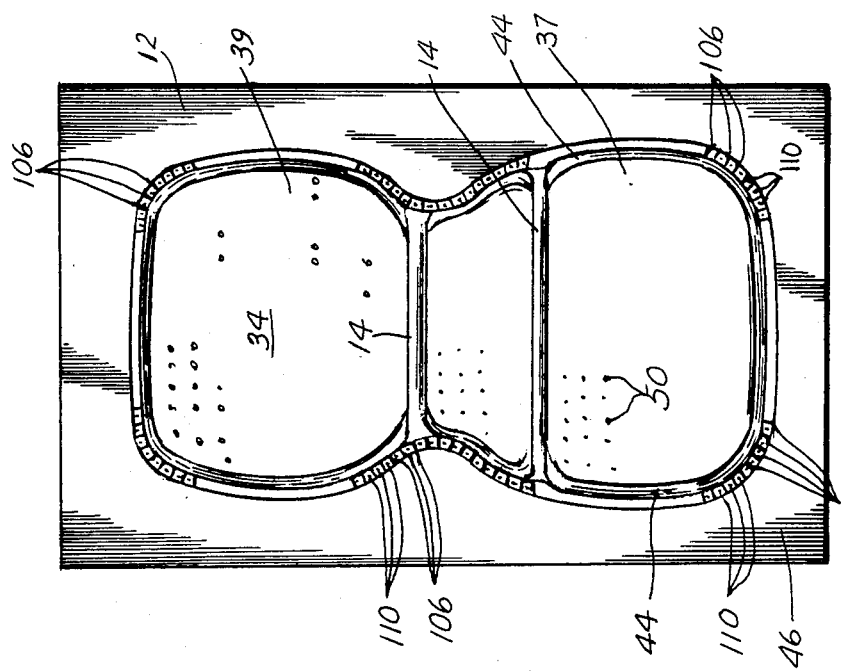

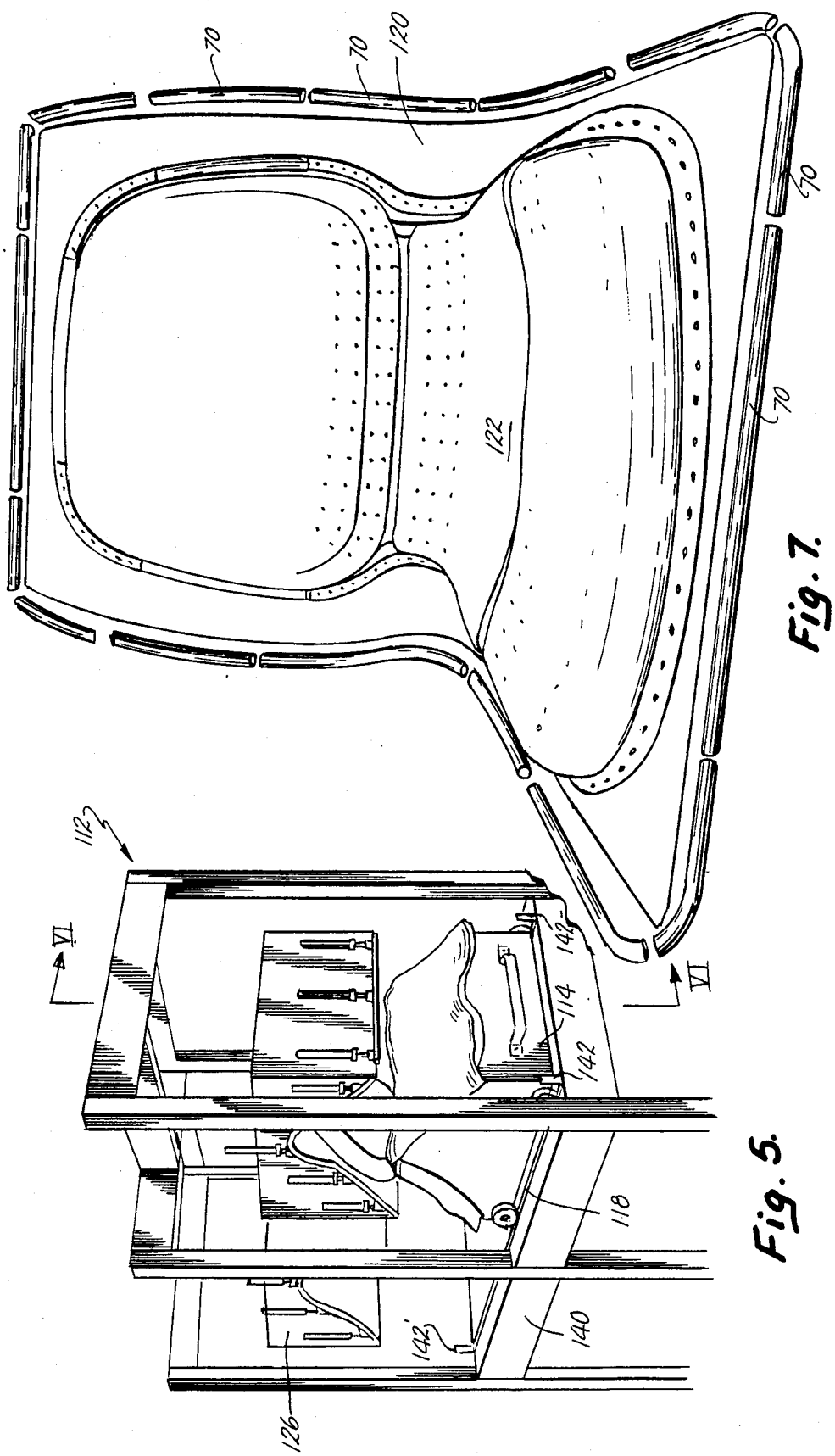

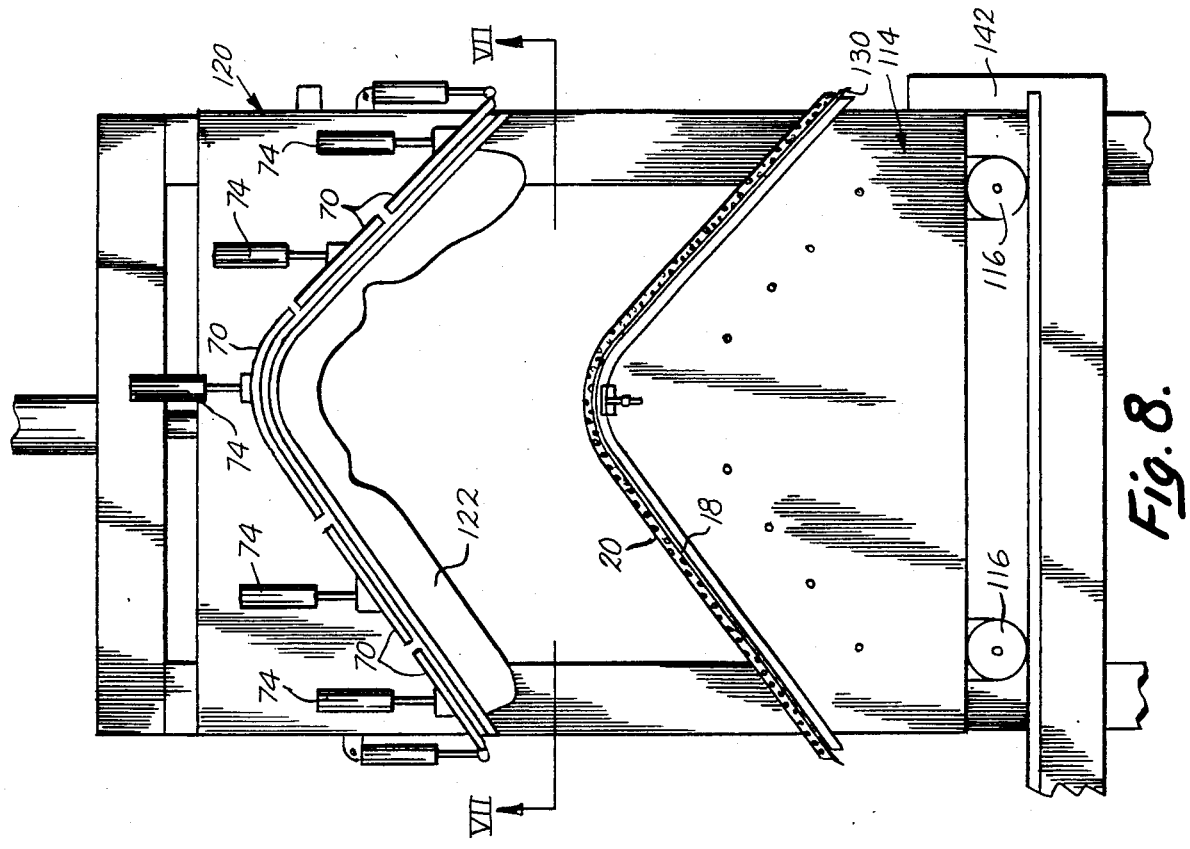
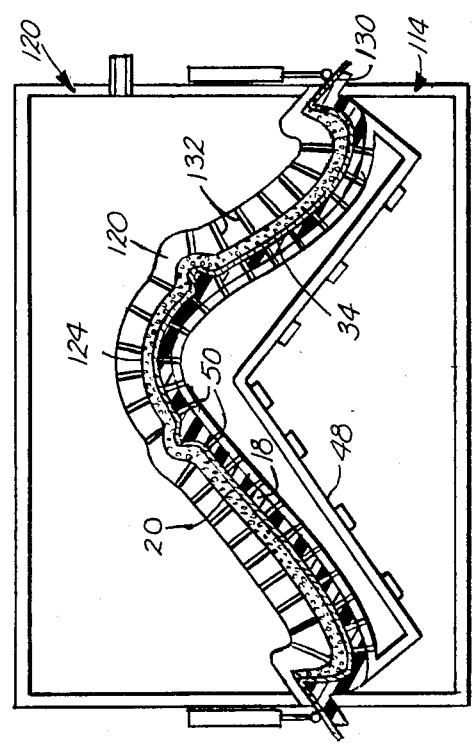
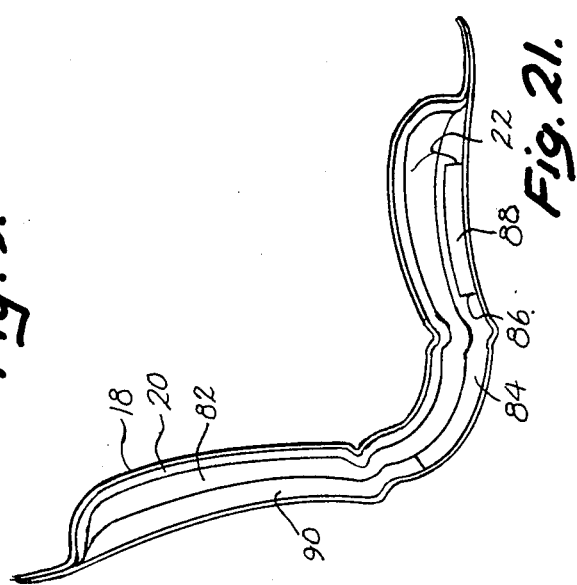

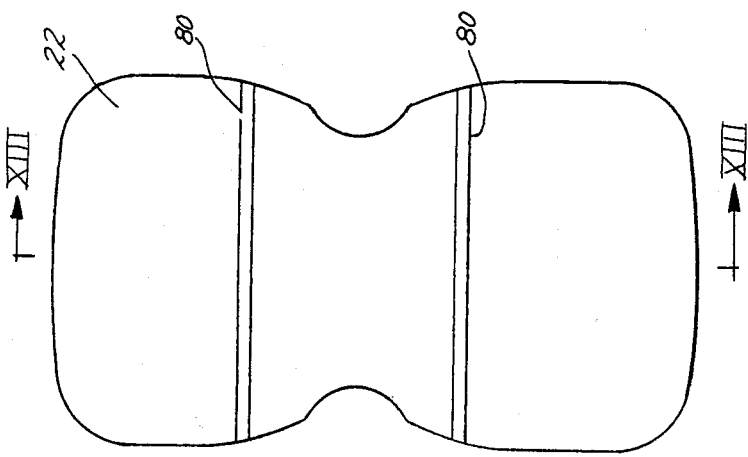
Fig. 12
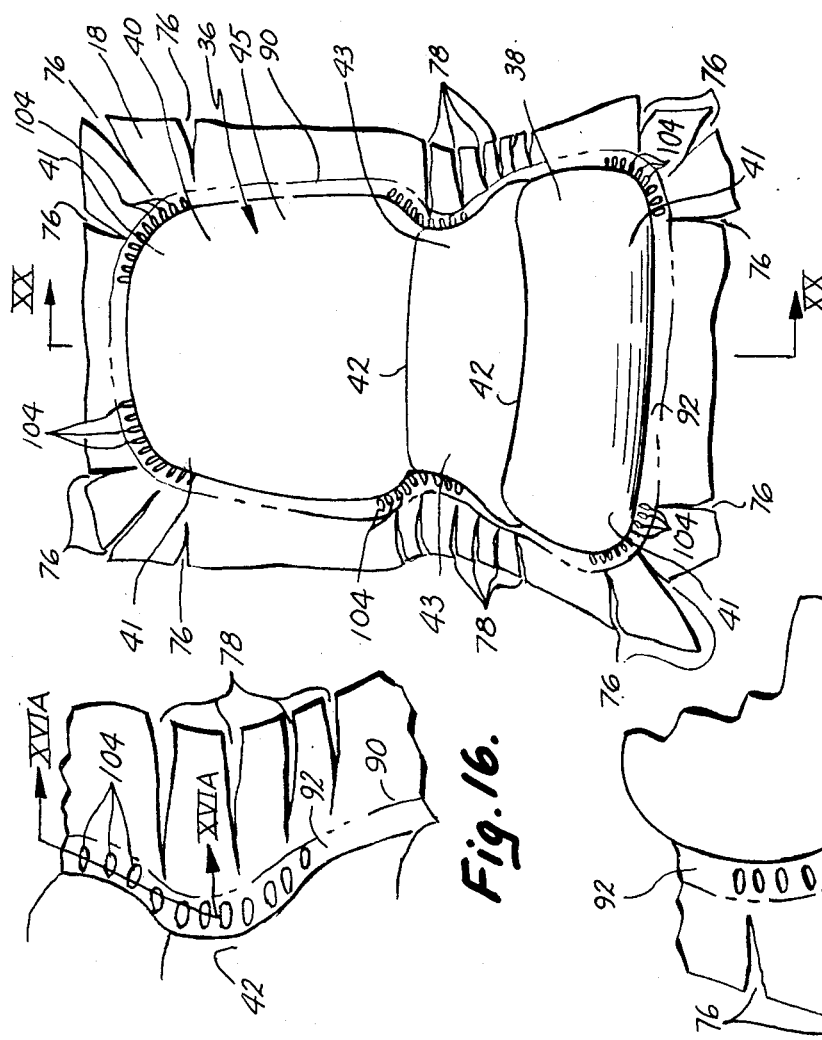
Fig. 14.
Fig. 15.
Fig. 16.

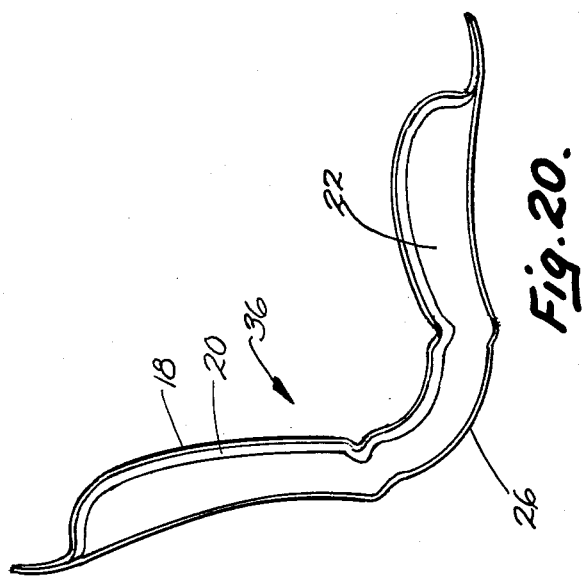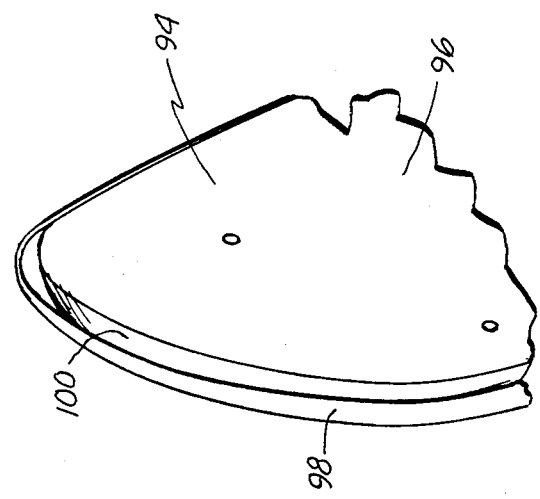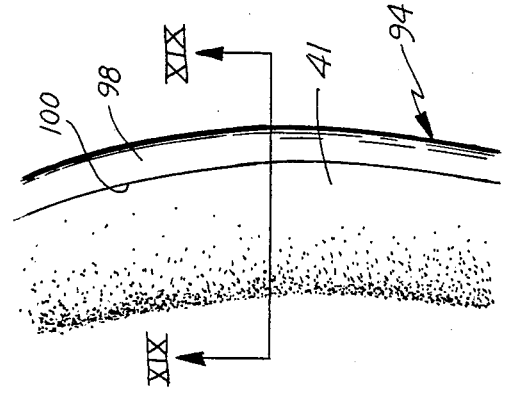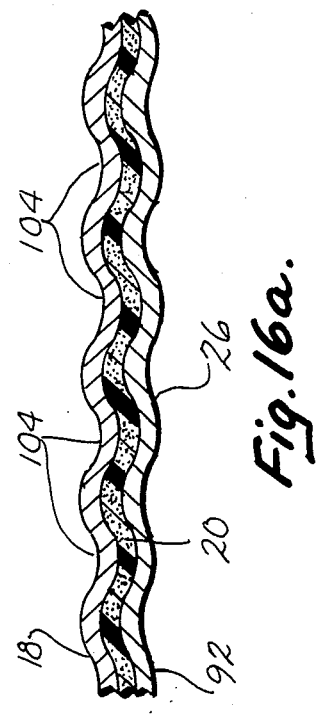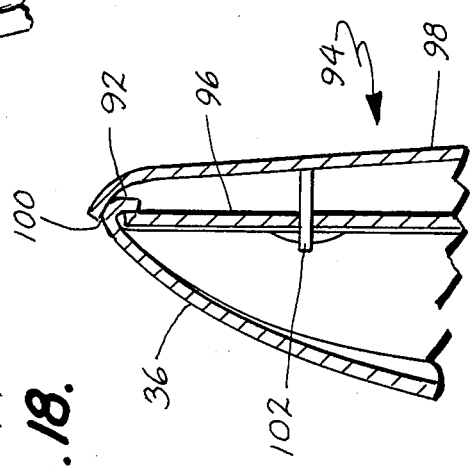

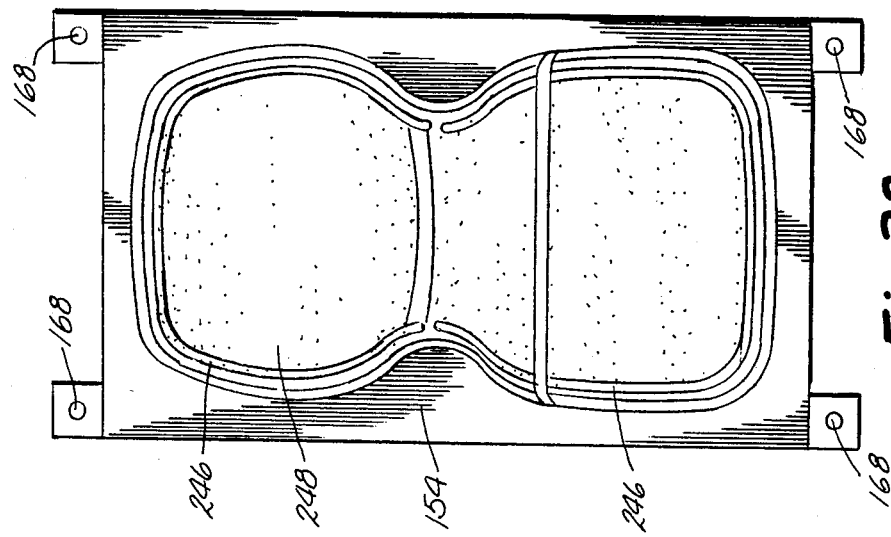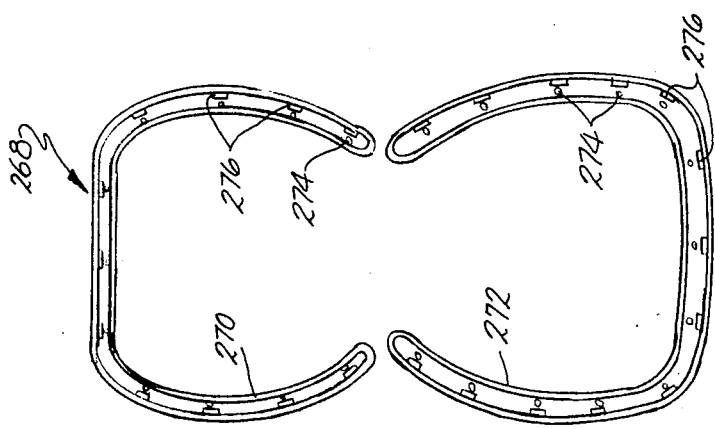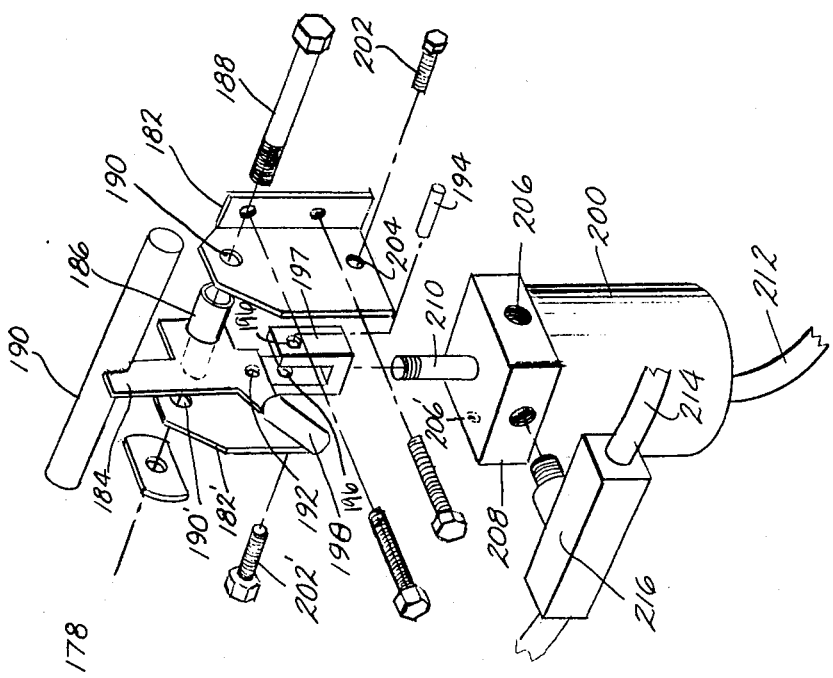

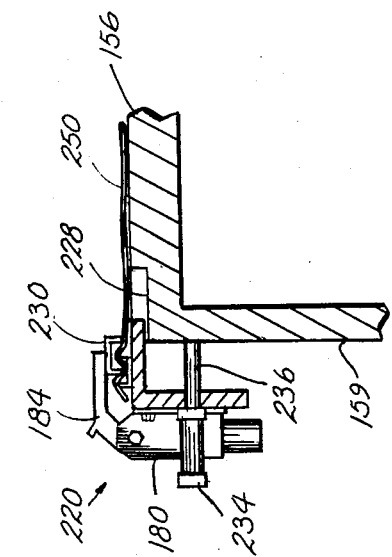
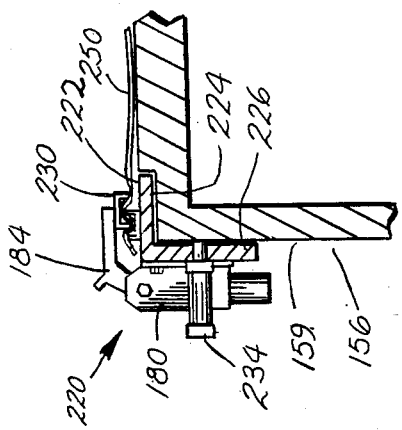
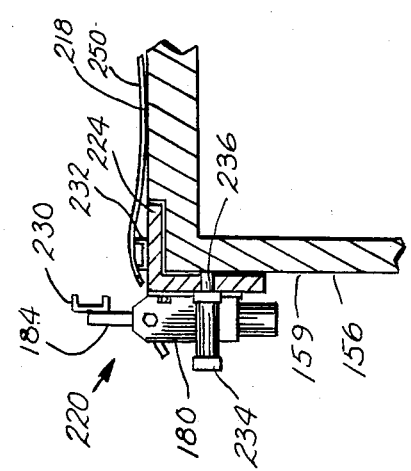
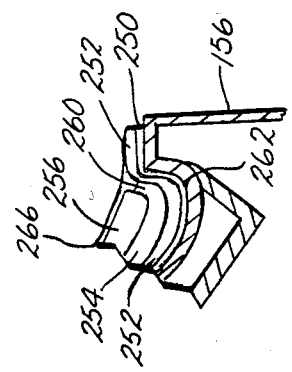
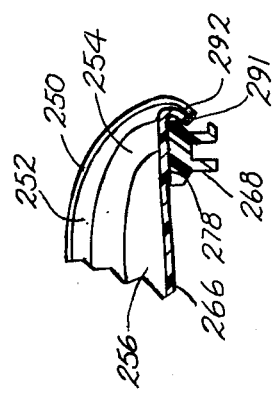
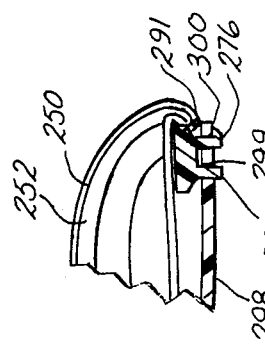

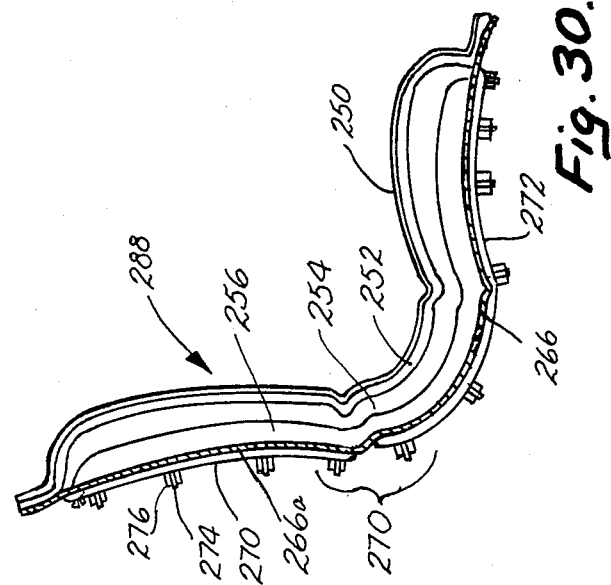
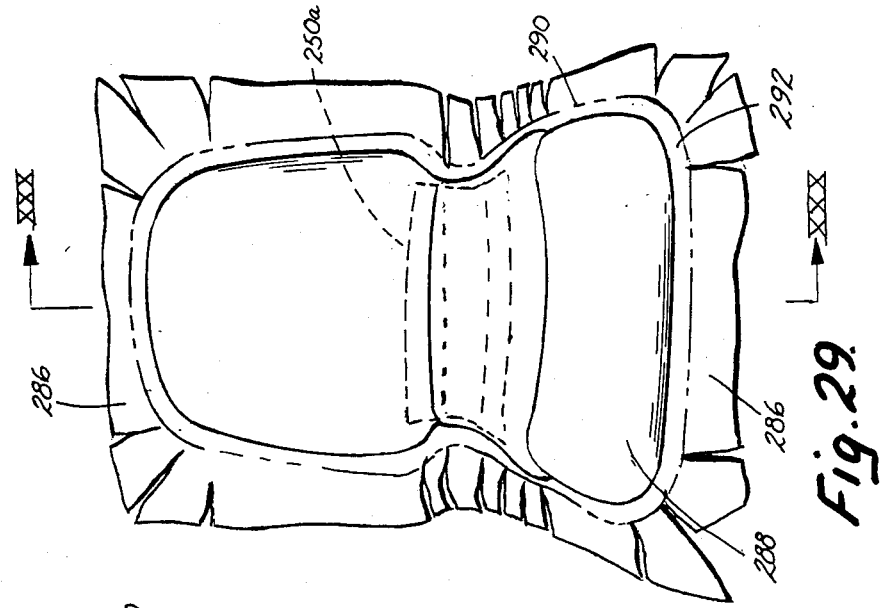
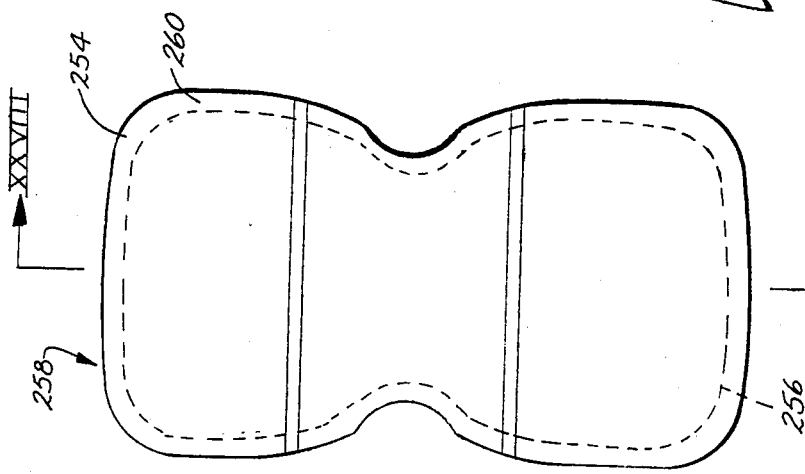

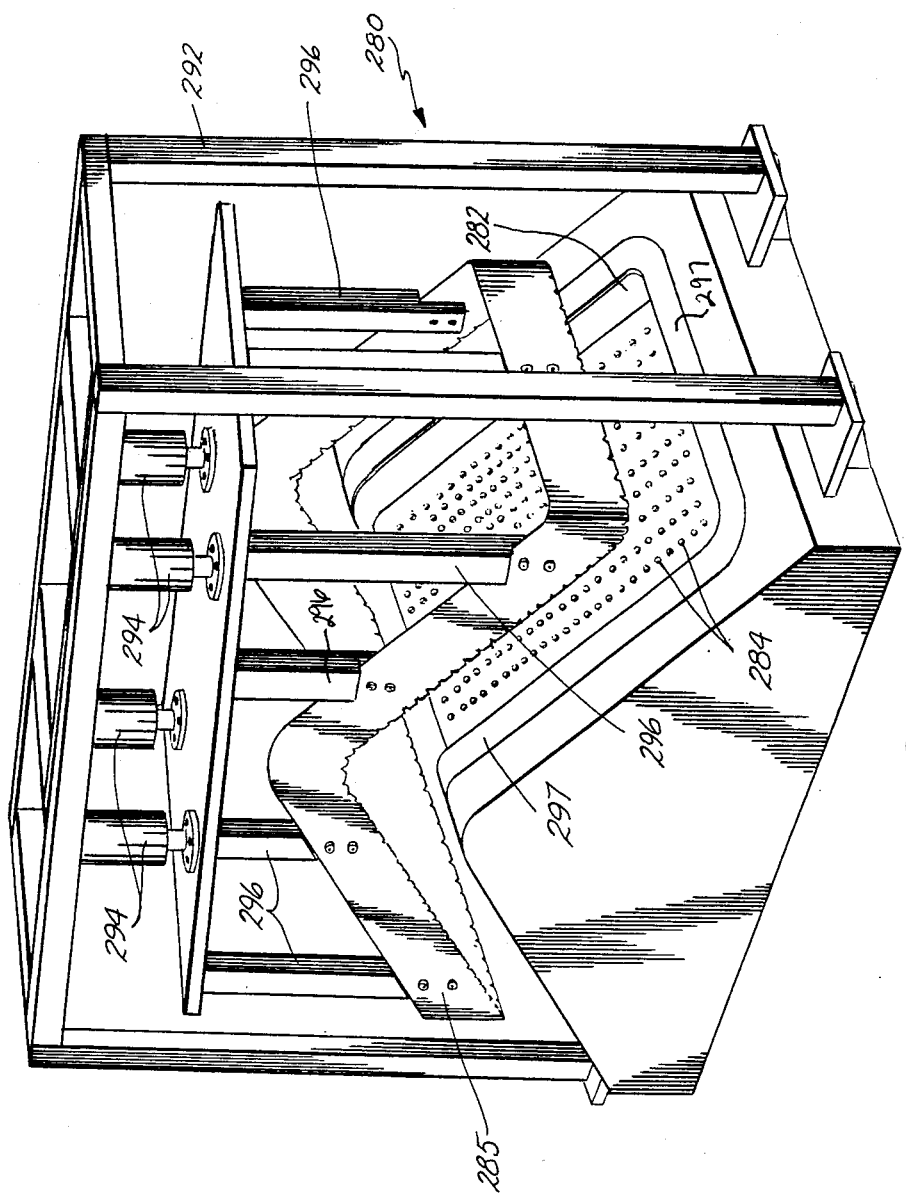

CUSHION MANUFACTURING PROCESS

BACKGROUND OF THE INVENTION

The present invention relates to processes for manufacturing upholstered chair cushions with sculpted effects on them.

Conventionally, chair cushions have been made by hand. Sculpting effects are achieved by placing the upholstery fabric over a thin foam topping layer and a thick cushion, and tying the layers together at selected locations with button tufting and/or sewn seams. The manual labor required is naturally quite expensive and time-consuming.

There have been numerous attempts to develop a simple, economical automated process for producing upholstered cushions. Many processes employ vacuum molds to drawn upholstery fabric into desired shapes. But a vapor impervious elastomeric backing sheet must generally be used to draw a vacuum on fabric. When the backed sheet of fabric is in a completed cushion, however, the cushion feels "hot" to the skin since it does not let the cushion breathe. The backing sheet can sometimes be eliminated when the fabric has a tight weave, but many tight weave fabrics feel hot, and many popular stylish fabrics are not tightly woven. Art representative of such processes include Sanson et al., U.S. Pat. No. 4,116,736 entitled "Method of Making a Foam Plastic Cushion Having a Peripheral Frame and an Exterior Cover" issued Sept. 26, 1978.

Others have tried to eliminate the hot feel of such vapor impervious upholstered cushions by using matingly configured dies and heat to shape the fabric. The underlying cushion is preshaped and then bonded to the shaped fabric to form the completed upholstered cushion. One way to shape the upholstered cushion is to injection mold the cushion from a foamed material, but when a cushion is injection molded, it forms a skin which is substantially vapor impermeable and hot to the feel. It feels generally much harder to sit on and feels less soft and pliable to the touch. Another way is to cave the cushion from a block of foam, but this is time-consuming, and often does not produce a cushion which accurately fits the shaped fabric. A third way to provide cushion which conforms accurately to the shape of the shaped fabric is to injection mold the cushion inside the fabric, but a hot skin is still formed. In addition, the foam polymer can wick into fabrics, bind the fabric filaments together, and give a rough feel to the fabric. Art representative of such processes include Urai et al., U.S. Pat. No. 4,107,829 entitled "Method of Manufacturing Seat Cushions" issued Aug. 27, 1978.

Finally in order to conform to the desired shape, an elastic fabric must be used. Such fabrics have a look and feel that may not be acceptable in many applications.

SUMMARY OF THE INVENTION

In the present invention, a sculpted cushion is formed by compressing a foam cushion and fabric layer, with an air permeable adhesive adjacent the fabric, between a first configured die and a second compression die, and subjecting same to heated vapors. In the most preferred embodiment a nonskinned cushion is used, thereby eliminating any vapor impermeable "hot" layer between the upholstery and cushion. Yet, a deep sculpted effect can be achieved.

BRIEF DESCRIPTION OF THE DRAWINGS

FIG. 1 is a lateral cross section through a press designed to produce upholstered chair cushions of the present invention;

FIG. 2 is a lateral cross section through the press of FIG. 1 illustrating the dies in the closed position;

FIG. 3 is a top elevation of the lower die used in the press of FIG. 1 taken generally along the plane of line III—III of FIG. 1;

FIG. 4 is a bottom elevational view of the top die of the press of FIG. 1 taken generally along the plane of line IV—IV of FIG. 1;

FIG. 5 is a perspective view of a press assembly used in an alternative embodiment of the present invention;

FIG. 7 is a bottom view of one of top dies used in the modified process taken generally along the plane of line VII—VII of FIG. 6;

FIG. 8 is a detailed side elevation of one-half of the press illustrated in FIG. 6 shown with upholstery fabric and cushion material placed therein;

FIG. 9 is a lateral cross section of the press of FIG. 8 illustrating the dies when urged together with fabric and upholstery therebetween;

FIG. 12 is a top plan view of a cushion used in molding an upholstered, sculpted chair cushion;

FIG. 14 is a front elevation of a substantially complete chair cushion produced according to either of the processes illustrated in FIGS. 1-4 or 5-11;

FIG. 15 is a detailed perspective view of a corner of the completed chair cushion illustrated in FIG. 14;

FIG. 16 is a detailed perspective view of the edge of the chair cushion of FIG. 14 at the juncture between the chair seat and back;

FIG. 16a is a cross section taken along the plane of line XVIa—XVIa of FIG. 16;

FIG. 17 is a fragmentary perspective view of a chair shell into which the upholstered cushion of the present invention is installed before installation of the chair cushion;

FIG. 18 is a fragmentary perspective view of the chair shell of FIG. 17 after installation of the chair cushion of the present invention;

FIG. 19 is a cross section taken along the plane of line XIX—XIX of FIG. 18;

FIG. 20 is a cross section taken along the plane of line XX—XX of FIG. 14;

FIG. 21 is a cross section taken along substantially the same plane as FIG. 20 illustrating the cushion of FIG. 13 in the upholstered chair cushion illustrated in FIG. 14;

FIGS. 25a-25c are cross sections taken along the plane of line XXIV—XXIV of FIG. 23 illustrating the stretching clamp assembly in various positions during operation;

FIG. 26 is a detailed perspective view of a clamp used on the lower die of the press of FIG. 22;

FIG. 27 is a top plan view of a foamed cushion used in the third alternative process of the present invention;

FIG. 28 is a cross section taken along the plane of line XXVIII—XXVIII of FIG. 27;

FIG. 29 is a front elevation of a partially completed chair cushion made with the third alternative process of the present invention;

FIG. 30 is a cross section taken along the plane of line XXX—XXX of FIG. 29;

FIG. 31 is a top plan view of two retainer members used to secure a cushion of a chair shell;

FIG. 32 is a bottom elevational view of the top die of the press of FIG. 23 taken generally along the plane of line XXXII—XXXII of FIG. 22;

FIG. 33 is a detailed cross sectional view of an edge of the chair cushion of the present invention bonded to a retainer member shown in FIG. 31;

FIG. 34 is a detailed cross sectional view of an edge of the chair cushion of the present invention during manufacture;

FIG. 35 is a detailed cross sectional view of the chair cushion of the present invention attached to a chair shell with a retainer member illustrated in FIG. 31; and FIG. 36 is a perspective of a cooling and trim fixture used in the second alternative process of the present invention.

DETAILED DESCRIPTION OF THE PREFERRED EMBODIMENTS

The process of the present invention is illustrated in several alternative embodiments herein. Broadly, it involves the use of configured dies (e.g., 12 in FIGS. 1-4, 114 in FIGS. 9 and 11 and 156 in FIG. 22) into which a foam cushion and a fabric covering layer with an air permeable, heat activated adhesive layer (e.g., powder or spray at from about 1.5 to about 8 grams per square foot, melting at between 185-210 degrees F.) therebetween are compressed and subjected to heated vapors (e.g., steam) at temperatures sufficiently high to generate temperatures in the cushion of from about 230 to about 240 degrees F., for from about 2 to about 35 seconds. The formed upholstered cushion is then cooled for from about 40 to about 80 seconds.

In other words, the assembly must be exposed to heated vapors at a temperature and for a time sufficient to melt and activate the adhesive, but not so hot and long as to promote wicking of the adhesive away from the bond line. Cooling must proceed sufficiently to freeze the adhesive. These parameters will vary as a function of the configuration desired and the material of which the configured dies are made. The process may optionally include an additional step, wherein prior to the foregoing, the upholstery is preshaped in the configured die by exposure to heated vapors for from 2 to 10 seconds.

First Embodiment, A Single Step Process

Figure 1A:
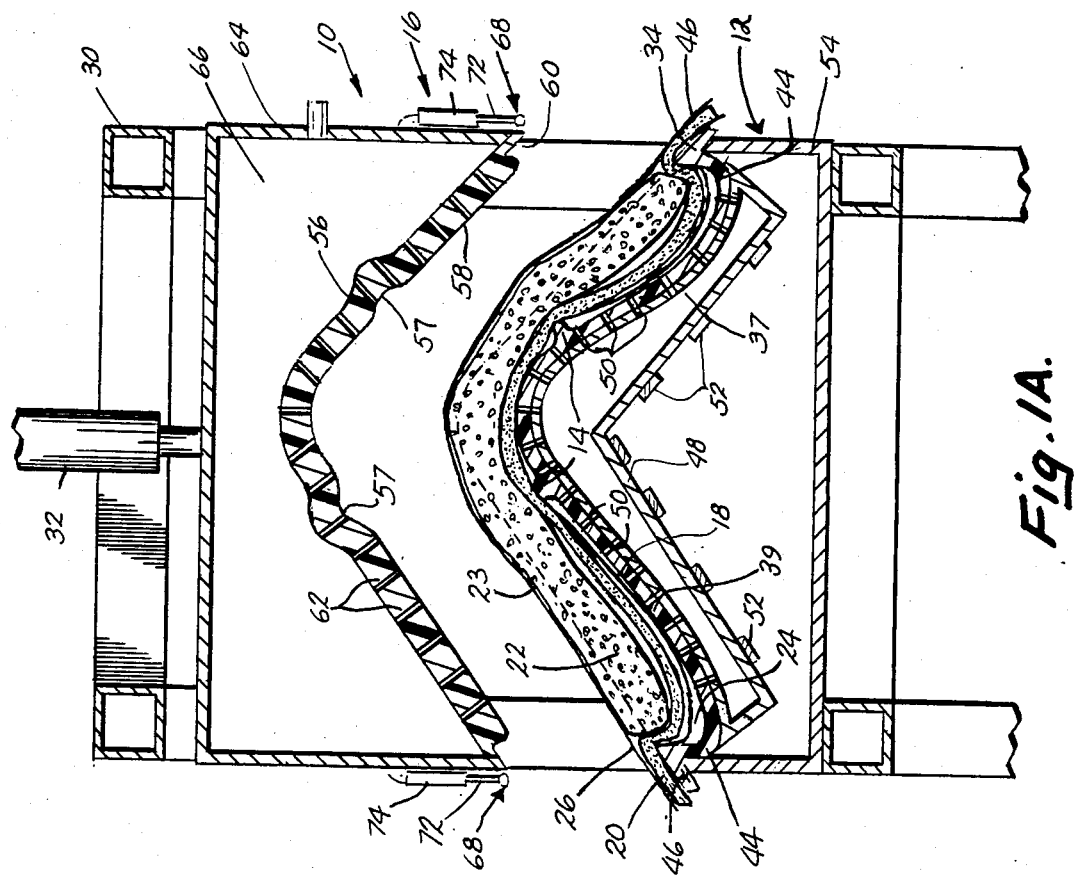
FIG. 1a is a lateral cross section substantially along the same plane as FIG. 1 illustrating the placement of upholstery fabric and cushions in the press of FIG. 1.
Figure 2A:
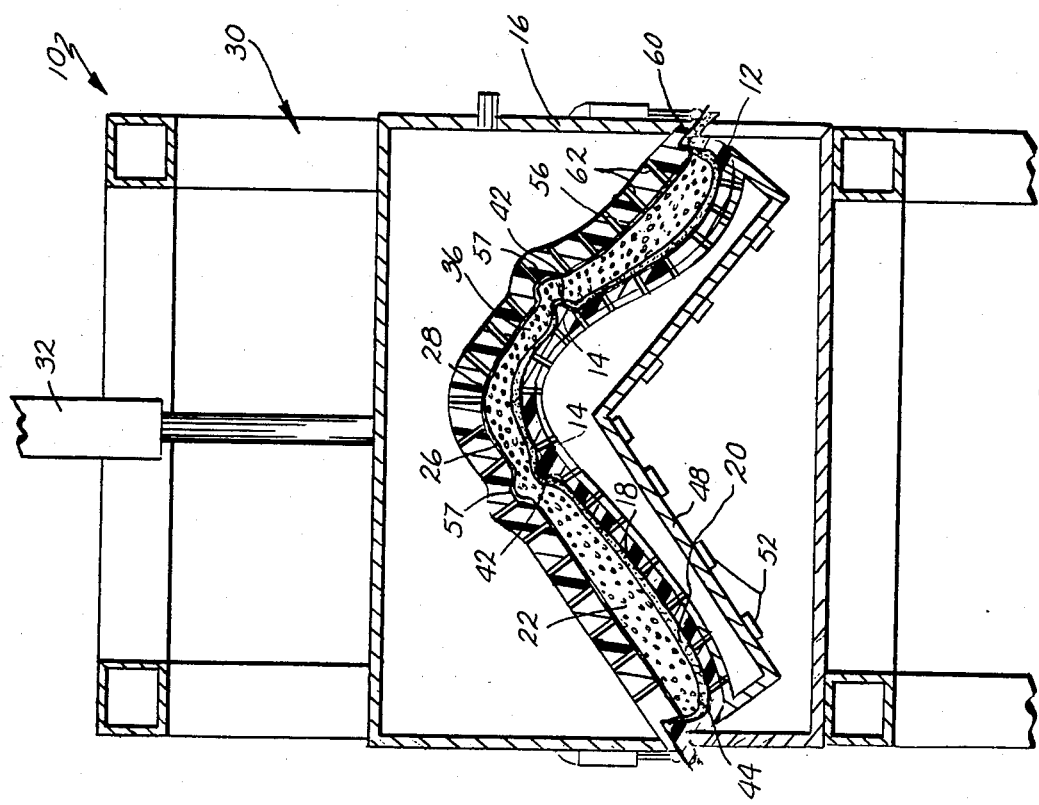
FIG. 2a is a lateral cross section of the press of FIG. 1 illustrating the dies in the closed position with upholstery fabric and cushions therein.

In a first embodiment single step process, press 10 (FIGS. 1-4) which includes the lower die 12 which is configured to the desired shape of the top or upholstered side of the upholstered cushion, including sculptural effects such as ridges 14 (FIGS. 1, 2 and 3). Press 10 also includes an upper die 16 which has the general shape of the back or upholstered side of the chair cushion. As shown in FIG. 1a, a piece of upholstery fabric 18 is placed overlaying lower die 12. The cushion means comprises a topping layer of nonskinned foam cushion material 20 and a thick nonskinned cushion 22. Topping 20 is first coated with a heat sensitive, air permeable adhesive on both sides and then is placed overlaying fabric 18 on lower side 12. Next, a thick foam cushion 22 is placed within the recessed portions 24 of lower die 12 after cushion 22 has been coated on its back side with a layer of heat sensitive, air permeable adhesive. Finally, a backing sheet of fabric 26 is placed over the back side of thick cushion 22. Once the layers are so arranged, the upper die 16 is urged toward lower die 12, forming a cavity 28 (FIGS. 2 and 2a). The combined thicknesses of the laminate, i.e., upholstery 18, cushion 22 and topping layer 20 is thicker than the distances between the upper and lower dies within cavity 28 so that when upper die 16 is urged toward lower die 12, thick cushion 20 and topping layer 22 will be compressed to force fabric layer 18 to assume the configuration of lower die 12. Furthermore, the compression of cushions 20 and 22 will force the cushions to assume the shape of cavity 28. After the dies are urged together, high temperature steam is injected into cavity 28, which molds both the fabric and cushions to the shape of the cavity and sets the heat sensitive adhesive so as to glue the layers together. The result is an upholstered cushion which is shaped with deep sculptural effects as well as being air permeable, lacking the hot feel of an upholstered cushion having a polymeric backing sheet incorporated in it or otherwise incorporating a nonvapor permeable skin or layer.

Press 10 includes a frame 30 which supports the lower die 12 above the floor and supports upper die 16 above the lower die (FIG. 1). A hydraulic cylinder 32 carries upper die 16 and urges upper die 16 toward and away from lower die 12. Hydrulic cylinder 32 is supported, in turn, on the upper part of frame 30.

Lowe die 12 (FIGS. 1 and 3) includes a die surface 34 made of epoxy and generally configured to have the shape of the exterior or upholstered surface of the upholstered cushion to be manufactured with the machine. The completed cushion 36 (untrimmed) is substantially shown in FIG. 14. For upholstered cushion 36, lower die surface 34 includes a seat portion 37 and a back portion 39. Lower die surface 34 includes ridges 14 near the juncture of seat portion 37 and back portion 39 which form two indentations 42 on cushion 36 (FIG. 2a). Ridges 14 are simply representative of the kinds of details which can be impressed into the completed upholstered cushion. Other kinds of shapes include the generally convex surface of the middle portion of seat portion 37 of lower die 12 which forms the generally concave middle portion of the seat portion of cushion 40. This concavity of the cushion seat portion 38 in its center conforms to the human posterior. A similar concavity is formed in the back portion of the cushion by a convex shape of the middle of the back portion 39 of lower die 12.

Lower die surface 34 has a deep rounded edge portion 44 which extends completely around the periphery of lower die surface 34 and forms the deeply drawn, rounded side portions 45 of upholstered cushion 36 which gives the upholstered cushion a deep, plush appearance.

Die surface 34 finally includes an apron 46 which extends around the periphery of edge portion 44 on which a retainer ring 68, to be described below, is urged when the upper die is brought toward the lower die.

Immediately below lower die surface 34 is located a steam chamber 48 made of aluminum (FIG. 1). Steam chamber 48 conforms closely to the shape of the rear surface of lower die surface 34, and a plurality of openings 50 extend through the wall of steam chamber 48 against lower die surface 34 and also extend through lower die surface 34 itself.

When the dies are urged together as shown in FIGS. 2 and 2a, steam is injected into steam chamber 48 whereupon steam will emerge through openings 50 into cavity 28 formed between the upper and lower dies. The provision of steam chamber 48 is desirable, but not necessary, to minimize the mass of the lower die which must be heated when the steam is injected into cavity 28. This reduces the condensation which occurs within the lower die and within cavity 28 because little of the steam's heat will be used in heating the machinery.

To reduce further the condensation of steam and/or the lowering of steam temperature, a plurality of electrical resistance heaters 52 are positioned along the lower wall of steam chamber 48 to heat the steam chamber and the lower die surface 34 at the same time. Preferably, heaters 52 are operated to heat steam chamber 48 to a temperature of roughly between 170 to 200 degrees F. This will also have the effect of heating lower die surface 34 to reduce condensation which may take place on it during steam injection. Lower temperatures can be used where aluminum dies are used as discussed below.

The last component of lower die 12 is a support housing 54 which supports lower die surface 34 and steam chamber 48 on frame 30. The dimensions and shape of support housing 54 are not critical.

Upper die 16 includes an upper die surface 56 made of epoxy resin and having a raised portion 58 and an apron 60 (FIGS. 2 and 2a). Raised portion 58 projects into lower die surface 34 to compress cushions 20 and 22 into fabric 18 and force fabric 18 to assume the shape of lower die surface 34. Upper die surface 56 also includes two valleys 57 which are located above ridges 14 on lower die surface 34.

Upper die surface 56 also includes a plurality of openings 62 through which cool air can be injected or a vacuum drawn in cavity 28, as described below. Above upper die surface 56, an upper die housing 64 carries upper die surface 56, forming an enclosed chamber 66 within housing 64 and above upper die surface 56.

A retainer ring 68 (FIGS. 1-2a and 4) is located around the apron portion 60 of upper die 16. Retainer ring 68 is composed of a plurality of ring elements 70, each of which is carried by a piston 72 of a hydraulic cylinder 74 supported from the sides of upper die housing 64. As shown in FIGS. 2 and 2a, when upper die 16 is moved downwardly atop lower die 12, cylinder 74 will urge retainer ring 68 against the apron portion 46 of lower die 12, the apron portion 46 of the lower die having wider lateral dimension than the apron portion 60 of the upper die, as shown in FIGS. 2, 2a and 3. Furthermore, when the two dies come together, the two apron portions 46 and 60 do not directly contact. The ony direct contact between the upper and lower dies when the two dies are brought together is through retainer ring 68 as shown in FIG. 2. Since the fabric 18 and topping layer 20 should be a sufficient size to extend beyond the apron portion 46 of the lower die when the two layers are placed over the lower die (FIG. 1a), retainer ring 68 will compress the topping layer 20 and fabric 18 against apron portion 46 of lower die 12 when the two dies are urged together.

When raised portion 58 of upper die 16 is urged into lower die surface 34, as the dies are brought together, it will compress cushion 22 and topping cushion 20 into the seat portion 37 and back portion 39 of the lower die, forcing the fabric 18 against and into these portions because cushion means 22 and 20 and upholstery 18 have a combined thickness greater than the distances between the dies in cavity 28 as indicated above. As fabric 18 and topping layer 20 are forced against the seat and back portions of the lower die by the compression of the cushions 20 and 22, those parts of the topping layer 20 and fabric 18 overlaying apron portion 46 will be drawn inwardly into the lower die. Without retainer ring 68, if the dies were urged together quickly, the fabric and topping layer overlaying apron portion 46 would be drawn in quickly as well, creating wrinkles in the completed product, especially near the corners 41 of the completed cushion (FIG. 14), and in the narrowed portions 43 between the seat portion 38 and back portion 40 of the completed cushion. To prevent the fabric from being drawn in so quickly, a downward pressure is applied through retainer ring 68 onto apron portion 46 of lower die 12 to allow fabric 18 and topping layer 20 to be drawn in slowly at a controlled rate into cavity 28 as the cushions are compressed. It has been discovered, however, that a uniform pressure is not desirable. Accordingly, selective pressure can be applied to the various ring elements 70 of retainer ring 68 through cylinders 74 to apply greater pressure in areas where a more controlled slippage is desired and a lesser amount of pressure in areas where a greater amount of slippage is desired. Each of the cylinders 74 is controlled individually so that the desired pressure can be applied to each ring element 70. The exact pressure required between ring elements 70 and apron portion 46 is not known and must be determined empirically for each different upholstery configuration. It is important, however, that none of the ring elements 70 fixedly clamp the fabric of the topping layer on apron portion 46 against any sliding into cavity 28. Some slippage is necessary to prevent wrinkling, but greater pressure is applied at the corners of the die to reduce the wrinkling which would occur there if no ring elements were provided.

As indicated above, intially the fabric 18 and topping layer 20 are placed overlaying the lower die 12. Cushion 22 is placed in the lower die, and backing sheet 23 is placed over cushion 22. Fabric 18, topping layer 20 and backing sheet 23 have pretty much the same area and should be cut to extend over the edges of apron portion 46 of lower die 12 (FIG. 1a). Both fabric 18, topping layer 20 and backing sheet 23 are cut in a generally rectangular shape. The corners of fabric 18, topping layer 20 and backing sheet 23 are cut with radial cuts 76 (FIG. 14) around those portions of fabric 18 and topping layer 20 which will form corners 41 of the upholstered cushion 36. Radial cuts 76 aid in reducing the wrinkling of fabric as fabric is drawn into cavity 28. Fabric 18, topping layer 20 and backing sheet 23 are further cut with a plurality of lateral cuts alongside that part of fabric 18 and topping layer 20 which will form narrowed portions 43. This too helps eliminate wrinkling in the narrowed portions. The radial cuts 76 and lateral cuts 78 form flaps of material between adjacent cuts. Each of the flaps is drawn underneath ring elements 70 at its own rate with comparatively little influence from adjacent flaps of fabric portions.

One has great latitude in selecting the type of fabric 18 to be used. Whereas some prior art processes require the use of stretch fabric, nonstretch fabric can be used in this process. Nonstretch fabric shows less than 3 to 5% elongation. It has generally a tighter weave and is often considered better looking. Further, the fabric can be backed or nonbacked. Even with parts which are very complex in configuration, we have found only a few fabrics which could not be used.

Before topping layer 20 is placed overlaying fabric 18 on lower die 12, it is coated with an air permeable adhesive on both sides. This adhesive is preferably a granular heat activated thermoplastic adhesive having a grain size of between 80 and 700 microns. Nylon or polyester are examples of types of hot melts which can be used. Preferably, the grain size is between 500 and 700 microns. The melting point of the thermoplastic adhesive should be from about 185 to about 215 degrees F. One melting at 205 degrees F. was found very acceptable. Finally, the adhesive should be applied at from about 2.5 to about 8 grams per square foot per side over both sides of topping layer 20. Preferably, the range of adhesive is between 2.5 and 3.5 grams per square foot per side, 3 grams per square foot being the most preferred. Above 8 grams per square foot, the adhesive begins to form a hard film which adversely affects the feel of the completed cushion. Below about 2.5 grams per square foot, the adhesion between the layers is believed to be insufficient when powdered adhesive is used and one is less likely to achieve good groove or other sculpted definition.

As an alternative, a spray hot melt adhesive can be used if sprayed in an open pattern. The material is preferably sprayed on in a web-like, open pattern. One particularly desirable type is a urethane having an initial melting point of around 190 degrees F. However each time it is remelted, it has a somewhat higher melting point. This facilitates application at lower temperatures and resistance to heat deterioration after application. One important advantage to this type of adhesive over powder is that you don't lose adhesive at the bond line as a result of particles dropping into the openings in the cushion foam. You can use less adhesive, i.e., down to about 1.5 grams per square foot per side. Being urethane it is also softer than the nylon or polyester powder discussed above.

Yet another adhesive alternative is a solvent spray, thermoplastic adhesive. Such materials ae usually urethane. it is sprayed on much like the spray hot melt described above and has the same advantages.

Topping layer 20 is a low density unskinned polyurethane foam of 30 HR (high resilient) density. The pore size of the polyurethane is related to the particle size of the adhesive inasmuch as the adhesive should not penetrate extremely deeply into the pores of the foam after it is applied, since it is desired to have most of the adhesion at the surfaces of the topping layer and extend a distance into the topping layer.

Thick cushion 22 is also an unskinned foamed polyurethane. However, it has a greater density than that of topping layer 20. Preferably, it has the density of about 50 HR. Skin is conveniently avoided on the foams by using cut foam, rather than molded buns.

This cushion 22 is placed atop topping cushion 20, but does not extend over apron portion 46 as shown in FIG. 1a. Instead, it is precut (FIG. 12), to round its corners and to remove material from those areas which will form narrowed portions 43 in the completed cushion. In addition, grooves 80 may optionally be cut into the bottom surface of cushion 22. Grooves 80 align with ridges 14 on lower die 12 and allow ridges 14 to press the topping layer into grooves 80 as the dies are urged together. The provision of grooves 80 on cushion 22 makes it possible to form deep, well defined depressions 42. However, grooves 80 are optional as indicated above.

Figure 13:
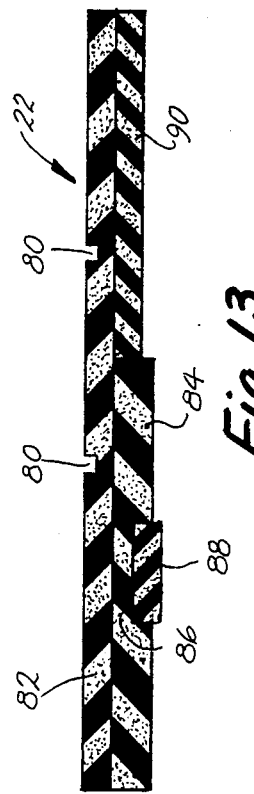
FIG. 13 is a cross section taken along the plane of line XIII—XIII of FIG. 12.

Cushion 22 can be a single piece of uniform density polyurethane foam (FIG. 1a). Optionally, cushion 22 can be made of a plurality of different cushion elements each having a different density (FIGS. 13 and 21). For instance, a low density foam layer 82 can be provided to be directly underneath topping layer 20 in the completed cushion. Low density foam layer 82 extends across the entire cushion 22 (FIG. 13). Underneath that portion of cushion 22 which will be located within the chair seat, a high density cushion 84 can be positioned. Within a recess 86 in high density cushion 84, another foam pad 88 having an even higher density can be located to provide greater support under the seat where support is necessary. However, in that portion of cushion 22 to be located in the chair back, another low density cushion 90 can be positioned against foam layer 82 abutting cushion 84 to provide a softness in the back of the chair where it is desired. The composite cushion illustrated in FIG. 13 is assembled and glued as an integral unit before it is placed into the dies. Conventional adhesives can be used to glue the various cushion elements together, but whatever adhesive is selected, it should be air permeable to eliminate the hot feel in upholstery cushions lacking air permeability. It should also withstand the elevated temperatures used in this process. If the wrong adhesive is used, or if too much of the right adhesive is used, a somewhat impermeable layer can be formed to prevent or unduly reduce vapor transmission.

As indicated previously, whether the composite cushion 22 as illustrated in FIGS. 13 and 21 is used or whether the uniform cushion 22, illustrated in FIG. 1a is used, cushion 22 is trimmed to fit within the lower die surface and not to extend over apron portion 46 (FIGS. 1a and 2a). Before foam cushion 22 is positioned on topping layer 20, the granular thermoplastic adhesive is applied on its back surface 23 (FIG. 1a). After foam cushion 22 is placed overlaying die 12 and topping layer 20, a backing sheet 26 is placed over the adhesively coated back surface 23 of cushion 22. Backing sheet 26 is approximately the same area as upholstery fabric 18 and topping layer 20 and extends over apron portion 46 as shown in FIGS. 1a and 2a. Backing sheet 26 can be made of any vapor permeable fabric. A nonwoven polyester fabric has been found to work well.

After the cushion elements 18, 20, 22 and 26 are positioned as described above on lower die 12, upper die 16 is lowered by hydraulic cylinder 32 on lower die 12. The upper die 16 is held at a controlled distance from the lower die so that upper die surface 56 does not clamp fabric or topping layer against the lower die surface. Adjustable stops can be positioned on the dies to assure this. Immediately after the two dies are brought together at the control distance, cylinders 74 are actuated, each at its selected pressure, so that ring elements 70 descend toward and engage the backing sheet 26, topping layer 20 and fabric 18 overlaying apron portion 46 of the lower die to control the slippage of topping layer 20 and fabric 18 into cavity 28. After ring elements 70 are so engaged, steam is injected into the preheated steam chamber 48 whereupon steam will be forced through openings 50 into cavity 28 formed between the two die surfaces.

Steam temperature is quite important. It is important that the steam temperature be sufficient to melt and activate the thermoplastic adhesive layers, which as indicated above, have a melting point of about 185–210 degrees F. It is also important that steam not condense on the die surfaces or in the upholstered cushion being formed. A wet cushion can be heavy to handle and difficult to install in a chair. Accordingly, it is preferable to use a dry, superheated steam. The temperature of the steam injected into cavity 28 is about 230–240 degrees F. as measured by heat sensitive strips which change color as specific, narrow temperature ranges. The strips were placed in a cushion assembly placed on the dies and removed after processing the cushion to determine the temperature in the cushion. A steam temperature of 700 degrees F. immediately prior to injection into steam chamber 48 has been measured and found to work well.

Generally, the steam is injected only for 20–35 seconds, 25 seconds being preferred. Much less time is needed for aluminum tooling, as opposed to the above described epoxy tooling, e.g., 2 to 5 seconds (see below). If injected for a much longer period of time, the melted adhesive will wick into the cushions and not form a strong adhesive layer to hold the cushion elements together. When steam is injected, the adhesive on both sides of topping layer 20 adheres the topping layer to fabric 18 and to cushion 22. Adhesive on the back of cushion 22 adheres it to backing sheet 26. Finally, the adhesive on those portions of topping layer 20 on apron portion 46 adheres topping layer 20 to the fabric on apron portion 46 and adheres the topping layer to the backing sheet overlying apron portion 46.

The hot steam has an important function besides melting the adhesive. It also shapes the upholstery fabric 18 to the shape of the lower die surface. It also shapes topping layer 20 and cushion 22 to assume permanently a shape substantially the same as cavity 28. In other words, the steam helps to shape topping layer 20 and cushion 22 to form a multi-density foam core within the completed upholstered cushion 36. The steam causes the foam to "densify" since the foam core, as indicated above, is compressed in cavity 28 when the dies are brought together.

It is significant that the adhesive be dispersed in a discontinuous open manner so that when melted by the steam, the discontinuous adhesive layers will allow vapor to be transmitted through the cushion and the adhesive after the adhesive sets when the cushion is cooled and installed on a chair.

After the steam is injected for 20–35 seconds, it is stopped and a vacuum is drawn in steam chamber 48 while cool air is injected into chamber 66 in upper die 16. The cool air is forced through openings 62 into cavity 28 to cool the cushion and to "freeze" the melted droplets of adhesive and to "freeze" the foam core in its shaped, densified state. The vacuum drawing cool air through the die is continued for about 40 to 80 seconds since that has been found to be sufficient to cool the upholstered cushion. After that, the completed part can be removed from the dies and installed on a chair in a manner to be described below.

After the molded, upholstered cushion 36 is removed from the die, the excess fabric, topping layer and backing sheet are trimmed from the cushion approximately around the dotted line 90 (FIGS. 14–16), leaving a narrow web or flange 92 of material which is used to secure upholstered cushion 36 to chair shell 94 (FIGS. 17–19).

The chair shell 94 (FIG. 17) into which upholstered cushion 36 is to be installed consists of an inner shell 96 and an outer shell 98. After the upholstered cushion is trimmed of the excess, web 92 is folded backwardly along the back cushion and inserted into a gap 100 between the inner and outer shells along the edges of the shells. The shells are then urged together by fastening means such as fasteners 102 to clamp web 92 between the two shells. Inner shell 96 will support the upholstered cushion while the outer shell captures the web of the cushion between the inner and outer shells and supports the inner shell (FIG. 19).

When web 92 is folded around the back of cushion 36 (FIG. 19), it has a tendency to cause puckers or pleating in the exposed portion of the upholstered cushion not captured between the two shells when the web is folded backwardly around corners 41 and/or narrowed portions 43. To eliminate those puckers, a series of parallel indentations 104 are molded into web 92 during the molding process described above (FIGS. 14, 15, 16 and 16a). The apron portion 46 of lower die 12 includes a plurality of spaced projections 106 (FIGS. 3 and 4) adjacent where corners 41 and narrowed portions 43 are formed. Each projection 106 is rounded and is longer than it is wide. The longitudinal axis of each projection 106 is oriented generally parallel to the direction of travel of fabric under retainer ring 68.

Corresponding sets of small recesses 108 are located on the apron portion 60 of the upper die. Recesses 108 are located immediately above projections 106 when the two dies are urged together during molding of the cushion. However, projections 106 are not closely received within recesses 108. As indicated above, it is necessary to allow fabric to slide between apron portion 46 and apron portion 60 as the upper die compresses the cushions to force the fabric and cushions to assume the shape of the lower die. Therefore, there will always be a gap between each projection and its corresponding recess to allow fabric to slide between them. Furthermore, the orientation of the elongated projections and elongated recesses parallel to the direction of travel of fabric into the die allows fabric to slide at a rate controlled by ring elements 70 into cavity 28 without being caught by projections 106 or being clamped into recesses 108.

Between each of the projections 106, a steam hole 110 is located. Steam holes 110 communicate with steam chamber 48, so when steam is injected into steam chamber 48, steam will emerge through steam holes 110 and permanently emboss indentations 104 into web 92 of upholstered cushion 36.

Indentations 104 forms channels between adjacent ridges on web 92 (FIG. 16a) and allow the excess material to gather when a curved portion of web 92 (such as around corners 41 or near narrowed portions 43) is folded backwardly around the back of the cushion (FIGS. 18 and 19). The excess material which gathers when a curved portion of web 92 is folded backwardly gathers within each indentation 104. The gathering occurs when the ridges adjacent each indentation 104 move closer together and fold material within each indentation 104. More importantly, the gathering of material is controlled and does not extend into the exposed portions of upholstered cushion 36 not clamped between the two shells. Thus, the gathering of material does not create any pleating on the visible portion of the cushion installed on the chair shell.

With the process thus far described, the shape of the completed cushion may not conform exactly to the shape of the lower die. It is necessary with some very deep or sharp sculpted effects to configure the lower die surface with exaggerated features, i.e., the sculpting features on the lower die surface (such as ridges 14) should be more prominent or project further than the depth or shape of the sculpted effects (such as groovse 42) on the completed cushion. With extremely deep or sharp effects it is desirable to use the two-step process described below.

Second Embodiment, A Two-Step Process

A second, two-step process of making an upholstered chair cushion according to the teachings of the present invention is illustrated in FIGS. 5–11. The first step involves premolding the upholstery into a configured upholstery body. The second is then similar to the one-step process described above.

The modified apparatus 112 includes two upper dies with a lower die movable underneath and between them. The lower die 114 is identical to lower die 12 described above, with the exception that it is mounted on wheels 116, or other such transport means, and is movable on tracks 118 from under one of the upper dies to a location under the other. The first upper die 120 is identical to upper die 16 described above with the exception that its upper die surface has a different shape (FIG. 7). The difference in shape is illustrated in FIG. 9 where dies 114 and 120 are shown when they close together. The upper die surface 122 of first upper die 120 is shaped to correspond fairly closely to the shape of the lower die surface 34 of die 114. First upper die surface 122 and lower die surface 34 may form a cavity 124 (FIG. 9) which is of a size to accommodate only the fabric 18 and topping layer 20 between them, compressing the topping layer when the dies are closed.

The second die 126 has a die surface 128 identical in shape to upper die surface 56 described above. When lower die 114 is moved underneath upper die 126, and the two dies are urged together, a cavity identical in shape to cavity 28 is formed which can accommodate and shape fabric 18, topping layer 20 and thick foam cushion 22.

Press 112 is operated in the following fashion. First, as shown in FIG. 8, fabric 18 is placed on lower die 12. Topping layer 20 is coated on one side with one of the thermoplastic adhesives described above, and the adhesive coated side is placed overlying fabric 18. Lower die 114 is then moved to a location underneath first upper die 120. Upper die 120 is then lowered onto lower die 114 at the controlled distance described above to permit fabric to be drawn inwardly into cavity 124. Immediately after the two dies are brought together, the retainer ring elements 70 are urged by hydraulic cylinders 74 against the apron portion 130 of lower die 114. This controls the rate of fabric slippage into cavity 124, as indicated above.

Next, dry, superheated steam is injected into the steam chamber 48 (FIG. 9) in lower die 114. The steam then emerges through openings 50 into cavity 124 to shape fabric 18 and topping layer 20 and mold the fabric and topping layer foam into a shell which conforms closely to the shape of cavity 124. About 5–10 seconds of steam is applied. As above, less can be used (2–5 seconds) where an aluminum mold is used. Then the steam is turned off and a vacuum is drawn through the bottom die drawing air through the openings 132 in upper die surface 122. The vacuum is applied for about 15–20 seconds, a time which has been found to be sufficient to cool the part. The shorter steam and vacuum temperatures are due to the fact that there is no thick cushion to heat in the first step of the two-step process. Thereafter, upper die 120 is raised to its retracted position shown in FIG. 8. Upholstery layer 18 and topping layer 20 are thereby molded either to or close to the ultimately desired shape. They would hold that shape even if removed from lower die 114 at this point.

Figure 11:
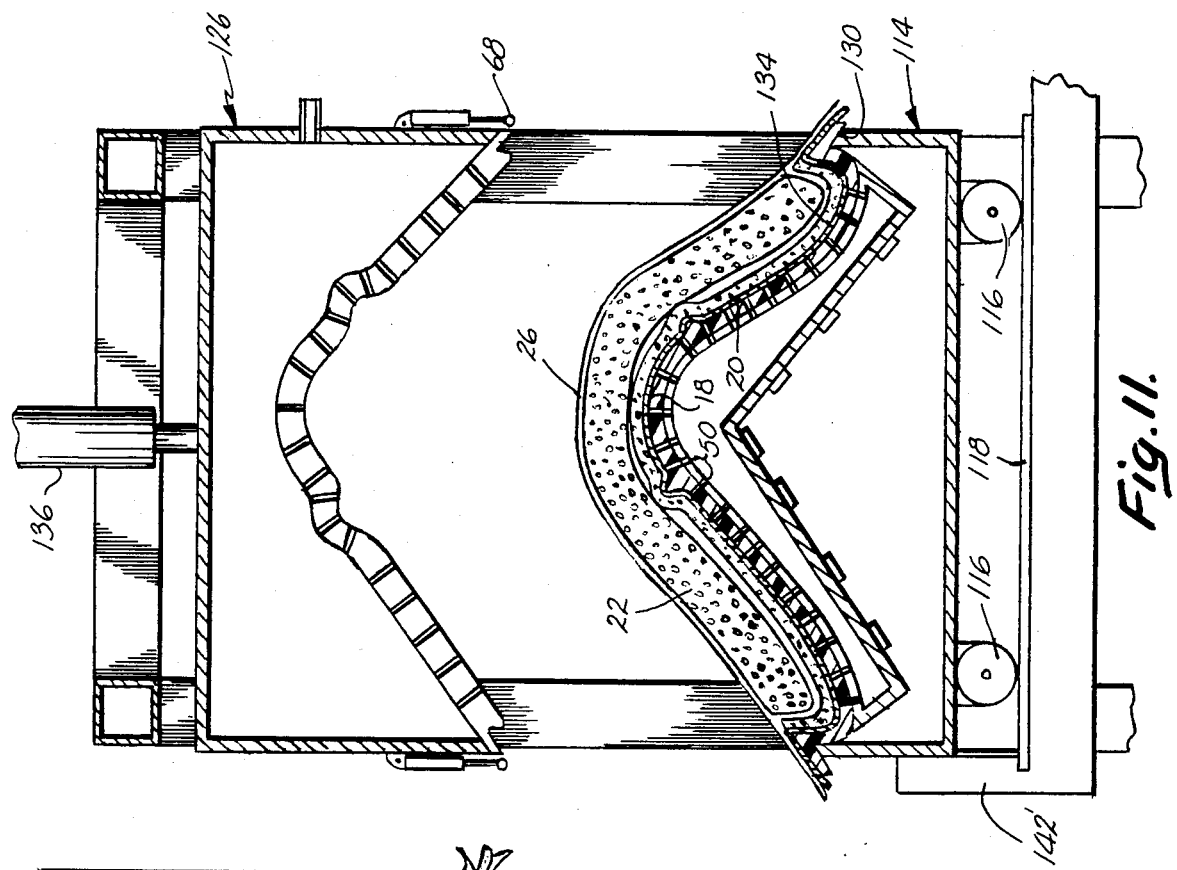
FIG. 11 is a detailed lateral cross section of the second half of the press of FIG. 6 with the lower die moved underneath the second upper die and shown with a second layer of cushion material placed in the shell formed in the process step illustrated in FIG. 9.
Figure 10:
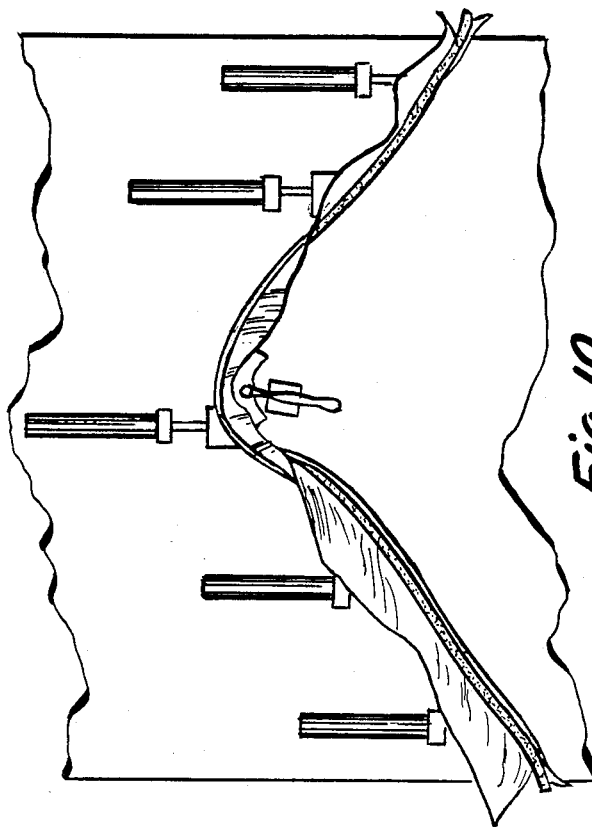
FIG. 10 is a detailed side elevation of the press of FIG. 8 shown with the dies in the closed position with upholstery fabric and cushion material placed therebetween.

Lower die 114 is then rolled via a screw drive or the like (not shown) on wheels 116 across rails 118 underneath the second upper die 126 as shown in FIG. 11. The configured upholstery body 134 (the molded fabric layer 18 and topping layer 20) is left on lower die 114 when lower die 114 is moved across from underneath the first upper die 120 to the second upper die 126. The thick foam cushion 22 is coated on both of its sides with the granular or other heat activated adhesive described above, and is placed within configured upholstery body 134. Again, cushion 22 has the shape illustrated in Fig. 12 with the corners rounded and material removed to form the narrowed portions 43 in the completed cushion. Grooves 80 can also be carved. Finally, cushion 22 can be one single piece of foam 22 illustrated in FIG. 11 or the composite multi-density layered foam structure illustrated in FIG. 13.

Once cushion 22 is placed within configured upholstery body 134 so as not to extend over the apron portion 130 on lower die 114 as shown in FIG. 11, a fabric backing sheet 26 is placed over cushion 22 so as to extend over the apron portion 130 around lower die 113.

A hydraulic cylinder 136 lowers second upper die 126 toward lower die 114 and holds upper die 126 at the "control distance" described above which allows fabric and topping layer to be drawn into cavity 28 formed between second upper die 126 and lower die 114 to the extent the final shape had not been set by the first step. Again, a retaining ring 68 (FIG. 11) made of a plurality of ring elements 70, is lowered onto the apron portion 130 of die 114 to control the rate of slippage of fabric into cavity 28.

Dry, superheated steam is injected into steam chamber 48 through openings 50 and into the cavity 28 between the two dies for about 20–25 seconds, 20 seconds being preferred. This has the effect of melting the adhesive on both sides of cushion 22 and gluing cushion 22 to topping layer 20 and to backing layer 26 to form the upholstered cushion 36 illustrated in FIG. 14 with either the composite, laminated foam cushion 22 illustrated in FIG. 21 or the uniform density foam cushion 22 illustrated in FIG. 20 being produced. Thereafter, about 60–75 seconds of vacuum is drawn in cavity 28 to cool the part.

Figure 6:
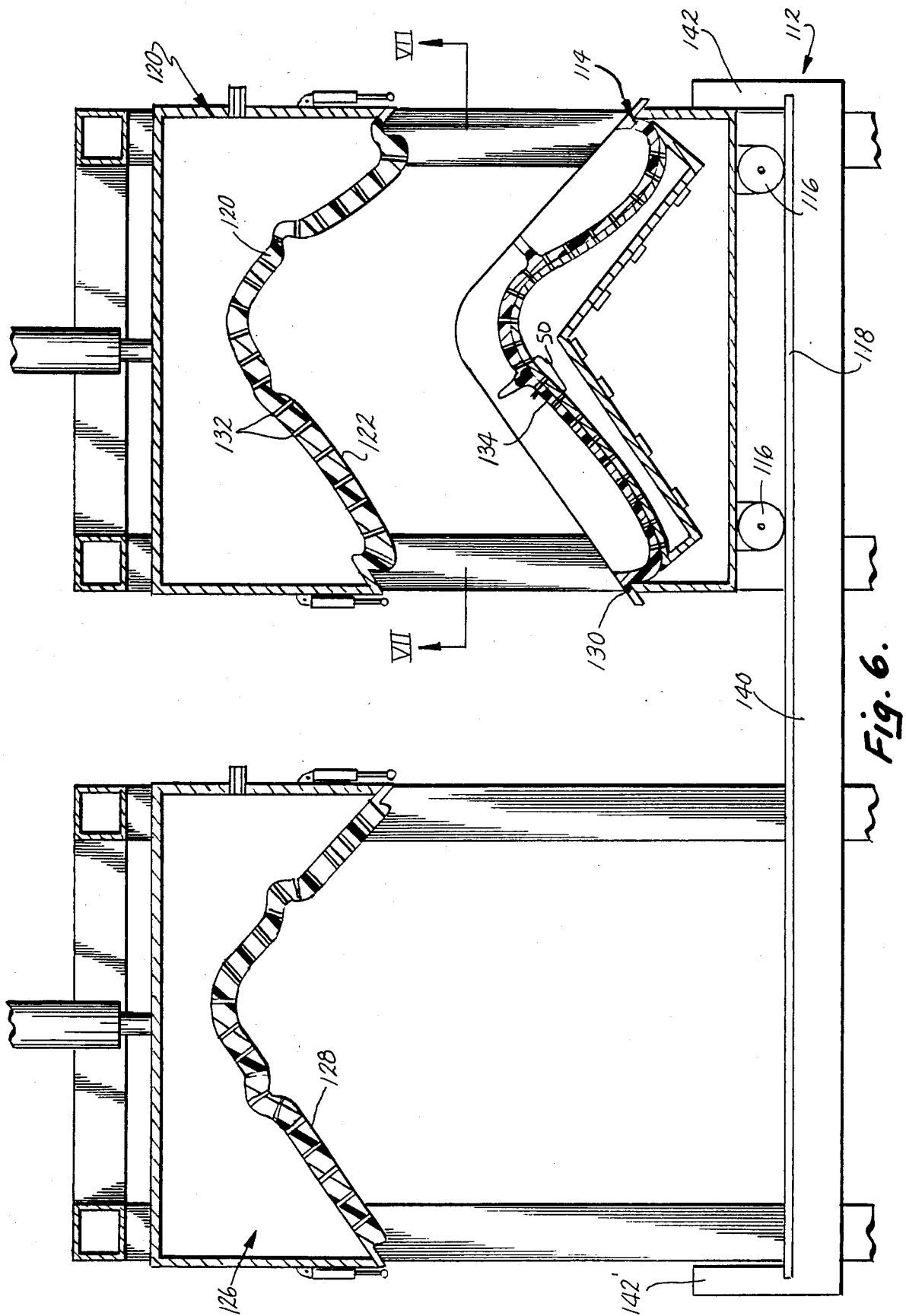
FIG. 6 is a cross section taken generally along the plane of line VI—VI of FIG. 5.

As shown in FIGS. 6 and 11, tracks 118 extend across a platform 140 which extends underneath the two upper dies 120 and 126. Stops 142, 142' are positioned at the ends of tracks 118 to act as locators for lower die 114. When lower die 114 is moved into contact with stop 142 (FIG. 6), it is in position to meet with upper die 120. When lower die 114 is moved into contact with stop 142' (FIG. 11), it is in position to meet with upper die 126.

With a two-step shaping process with the fabric and topping layer being shaped in one step together and being shaped again with the thick foam cushion in another shaping step on the same lower die, the upholstered cushion can be shaped twice and drawn more closely to the shape of the lower die surface. Sometimes, a single-step shaping process will not produce deep sculptural effects on the cushion, whereas a two-step shaping process will.

Third Embodiment, A Two-Step Process

The third embodiment process is in a sense, a second generation version of the two-step process described above. The further improvements described in connection with the second-step are equally applicable to the first embodiment single-step process described above.

Figure 22:
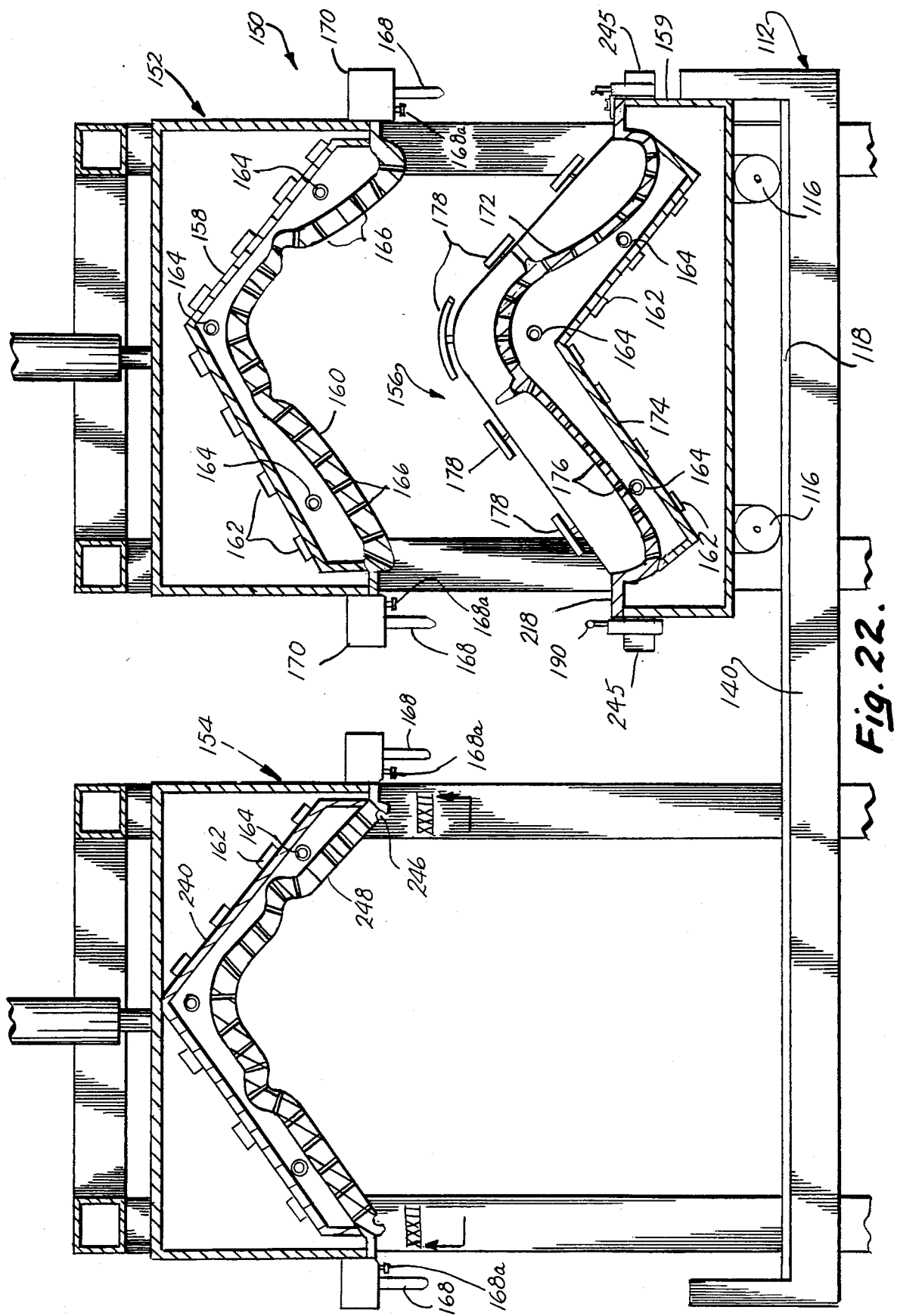
FIG. 22 is a lateral cross section through a press assembly used in a second alternative embodiment of the present invention.

A press 150 used in the third embodiment process of the present invention is illustrated in FIGS. 22–32. Press 150 is similar in construction and operation to the modified press 112 shown in FIG. 6. Press 150 includes two upper dies 152, 154 and a movable lower die 156. Upper die 152 is substantially the same shape as first upper die 120 inasmuch as it extends into lower die 156 to form a shell-like member similar to the one formed by the process step illustrated in FIG. 9. However, die 152 includes a steam chamber 158, and the die surface 160 of upper die 152 is made of aluminum, not epoxy. Die surface 160 also forms one wall of steam chamber 158. Steam chamber 158 has a plurality of electric resistance heating elements 162 which heat steam chamber 158 and die face 160. Steam is injected into steam chamber 158 by three spaced nozzles 164 (FIG. 22). Each nozzle 164 extends the entire width of die 152 within steam chamber 158. Each nozzle 164 is basically a tubular element with a plurality of openings distributed more or less uniformly along its entire length and surface. Since the three nozzles 164 are spaced apart within steam chamber 58, the steam will be distributed evenly within the steam chamber and emerge evenly through openings 166 which are randomly distributed about the surface of die face 160 and have a diameter of about 0.060 inches.

Upper die 150 further includes locator pins 168 which extend downwardly from upper die 152. Each locator pin 168 is mounted on a mounting block 170 attached to a corner of upper die 152. Each locator pin 168 is received within openings 244 (FIG. 24) in guide blocks 245 located at the corners of lower die 156 when the dies are urged together. Adjustable spacer stops 168a on mounting blocks 170 (FIG. 22) insure proper spacing between the dies when upper die 150 is lowered.

Lower die 156 is substantially the same as lower die 114 shown in FIG. 6. The shape of its die face is substantially the same as die face 34 of lower die 12. However, lower die face 172 is made of aluminum, not epoxy, and forms a wall for steam chamber 174 located within lower die 156. Steam chamber 174 also has three spaced steam injector nozzles 164 identical to the steam injector nozzles described previously for uniform injection of the steam within steam chamber 174 and out of openings 176 which are randomly distributed over the surface of lower die face 172. Steam chamber 174 is also heated by resistance elements 162 which heat the chamber and die face 172 to prevent condensation of the steam and wetting of the part made in the tool.

Lower die 156 also includes a plurality of clamps 178 which are located spacedly around three sides of lower die 156. Another set of clamps 180 similar in construction to clamps 178 are positioned spacedly along the fourth, front side of lower die 156. These clamps define a segmented clamping ring as discussed above.

Each clamp 178 (FIG. 26) includes two spaced mounting brackets 182, 182' mounted on the vertical sidewalls of lower die 156 between which is located a bell crank 184. One arm of bell crank 184 includes a tubular sleeve 186 which extends across and through bell crank 184 to receive a mounting bolt 188 which extends through openings 190, 190' in brackets 182, 282' and through sleeve 186 to mount bell crank 184 pivotally to and beteen mounting brackets 182, 182'. Another arm of bell crank 184 includes a clamping bar 190 which extends transversely of bell crank 184. Finally, the third arm of bell crank 184 has an opening 192 through it. A pin 194 passes through openings 196 through the free ends of a clevis bracket 198 and through opening 192 to secure clevis bracket 198 to the third arm of bell crank 184. Also attached to the third arm of bell crank 184 is a handle 198 which can be used to operate the clamp manually.

Suspended between the two mounting brackets 182, 182' is an air cylinder 200. A bolt 202 or 202' passes through an opening 204 in each bracket 182 or 182' and into a threaded passage 206, 206' on the side of a block-like cap member which forms the top of cylinder 200. Extending through the top of cap member 208 is a piston rod 210 which at one end is attached to the piston within the cylinder and the other end of rod 210 is threadably secured to clevis bracket 197.

Figure 23:
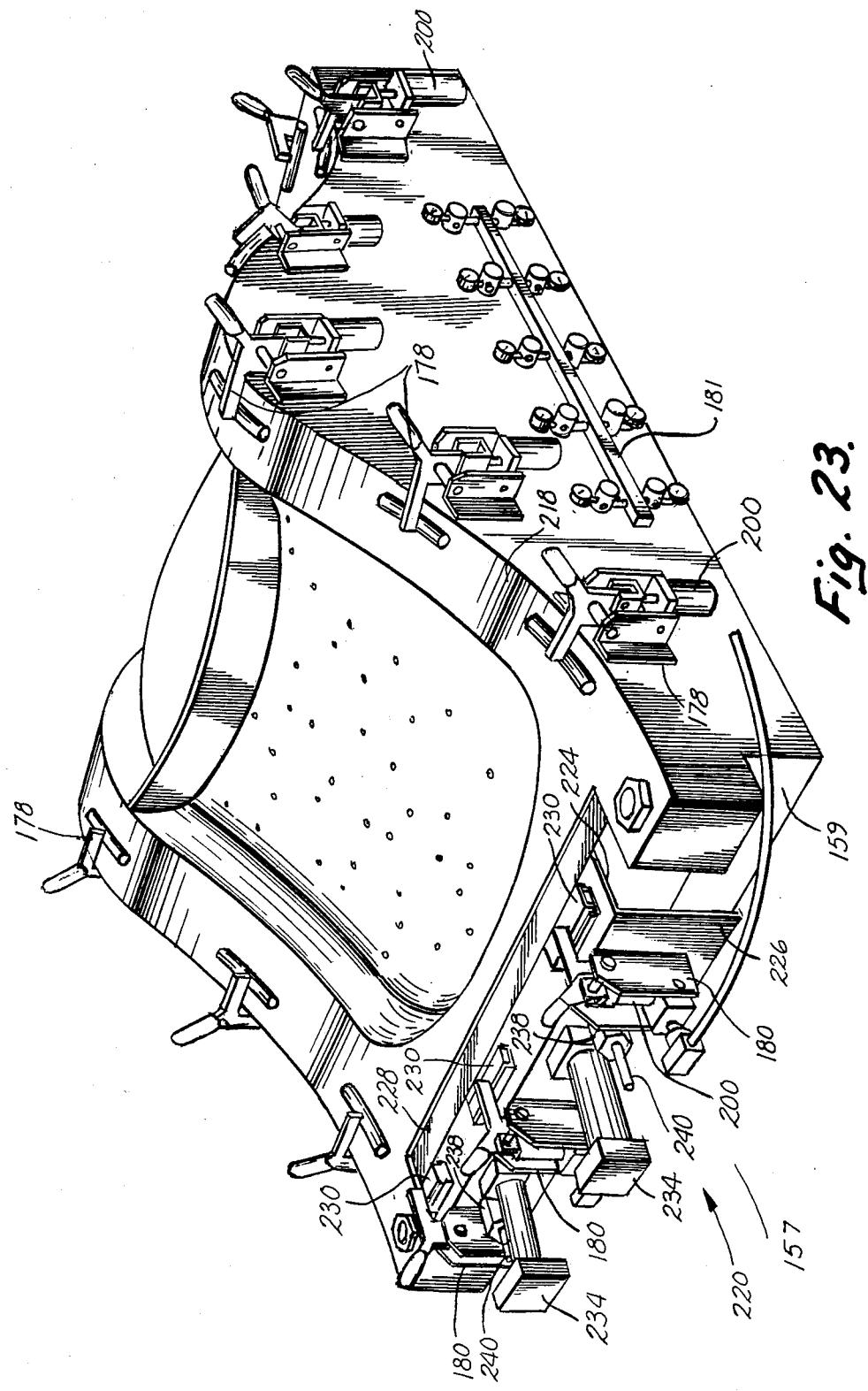
FIG. 23 is a perspective view of the front end of the lower die of the press assembly of FIG. 22.
Figure 24:
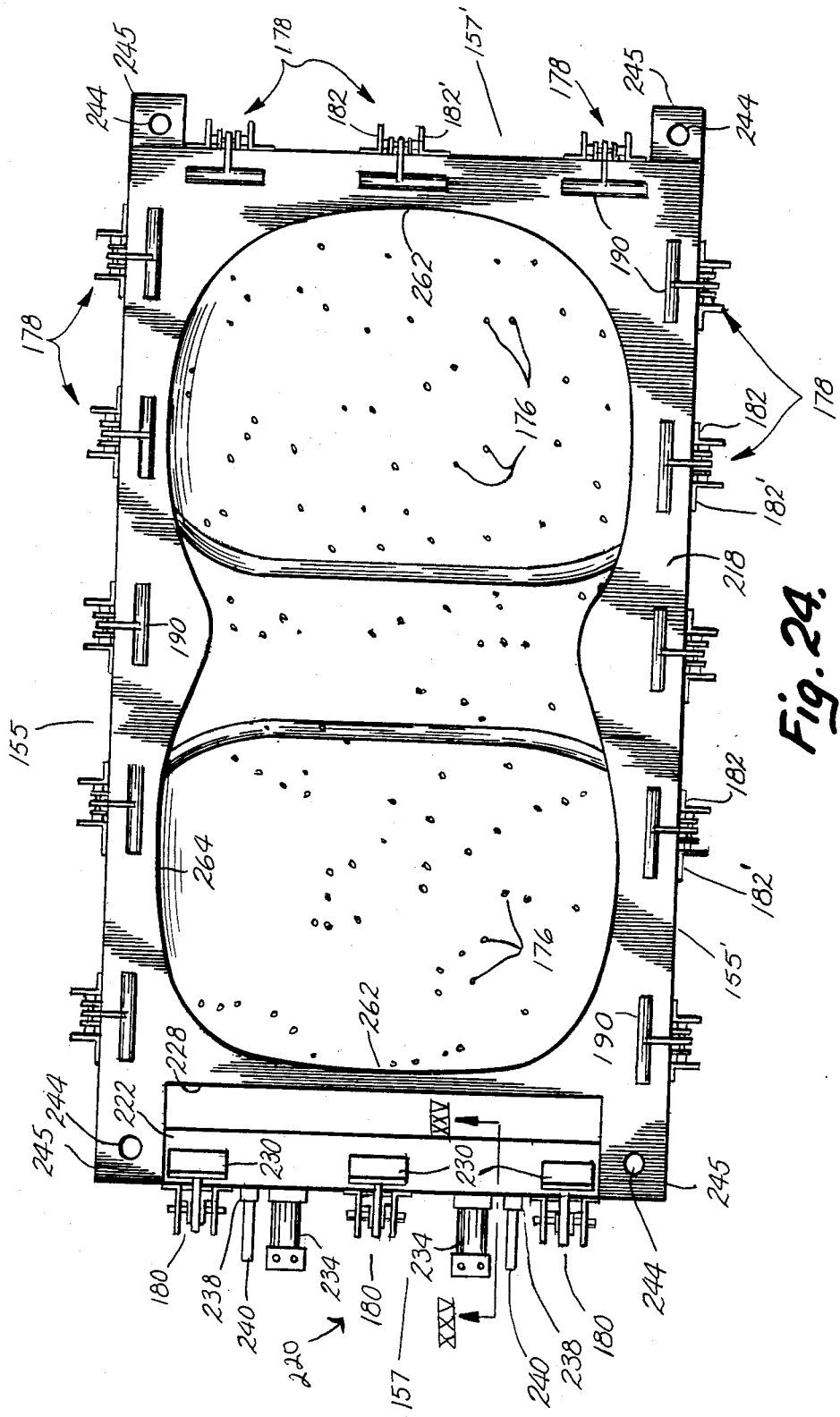
FIG. 24 is a top plan view of the lower die of the press assembly of FIG. 23.

Cylinder 200 is double actuated. It is filled by an air line 212 whereupon piston rod 210 is forced out of cylinder 200 (FIG. 26). Piston rod 210 is retracted when air is injected through a line 214 into a distribution block 216 which screws into cap member 208. When piston rod 210 is fully extended, clamp 178 assumes the closed, clamped position against the apron portion 218 of lower die 156 as bell crank 184 pivots on mounting belt 188 to the clamped position (FIGS. 23 and 24). When piston rod 210 is retracted within cylinder 200, clamp 178 assumes the unclamped position illustrated in FIGS. 22 and 26.

When in the clamped position, clamps 178 can embrace fabric between clamping bar 190 and apron portion 218. The clamped position does not prevent fabric from sliding between bars 190 and apron portion 218, but rather allows a limited slippage of the fabric between bars 190 and apron portion 218.

On the front side 157 (FIGS. 24 and 25a–25c) of lower die 156, stretch clamp assembly 220 is mounted. Stretch clamp assembly 220 includes an elongated angle support 222 having a horizontal web 224 and a vertical web 226. Horizontal web 224 rests slidably within a recess 228 (FIGS. 23 and 25a–25c) along the front edge of lower die 156. Vertical web 226 rests against the front vertical surface 159 of lower die 156 when the stretch clamp assembly is not activated (FIG. 25a).

Mounted on vertical web 226 are three clamps 180 which are identical to clamps 178 except that clamps 180 do not have clamping bars 190. Instead, clamps 180 have a channel-shaped clamp member 230 mounted on bell crank 184, which mate with channel-shaped members 232 mounted on horizontal web 224, when clamps 180 are clamped (FIGS. 23, 25*b* and 25*c*).

Clamps 180 are movable in tandem toward and away from front surface 159 because the three of them are mounted on angled support 222 which is retractable away from the front edge of lower die 156 (FIGS. 25*a*–25*c*). Two double activated air cylinders 234 are mounted on vertical web 226. Air cylinders 234 are fixedly secured to vertical web 226 while pistons 236 of air cylinders 234 are fixedly secured to the vertical front surface of lower die 156 and extend through vertical web 226 (FIGS. 25*a*–25*c*). When cylinders 234 are actuated to extend pistons 236 from cylinders 234, angled support 222 will be forced away from lower die 156 (FIG. 25*c*). When air cylinders 234 are actuated to retract pistons 236 within cylinders 234, support 222 will be pulled toward lower die 156 (FIGS. 25*a* and 25*b*).

To guide angled support 222 from its extended to its retracted positions, a pair of guide sleeves 238 are mounted spaced from each other on vertical web 226′. Guide sleeves 238 receive guide rods 240 which are fixedly secured to front vertical surface 159 of lower die 156, and are slidably received within guide sleeves 238. As stretch clamp assembly 220 is extended and retracted, guide sleeves 238 will slide along the stationary guide rods 240. Since the two guide rods 240 are parallel, they will control the movement of stretch clamp assembly toward and away from the lower die, and reduce wobbling or irregular movement of the stretch clamp assembly.

Each clamp 178 or 180 can be automatically and independently operated by a control assembly 181 (FIG. 23). In operation, clamps 178 and 180 clamp and unclamp simultaneously, but it is desirable to have each clamp 178 or 180 apply its own, selected clamping pressure to the edge of the fabric. The clamping pressure depends on where wrinkling is likely to occur in the fabric as the fabric is shaped. Usually, where wrinkling is heavy, a greater clamping pressure is desired, but the clamping pressure usually will not prevent slippage of the fabric between the clamp and the apron portion of the lower die.

When the upholstered part to be made is generally symmetrical, the clamping pressure exerted by clamps 178 and 180 should be generally symmetrical as well. For instance, each clamp 178 mounted on one of the sides 155, 155′ (FIG. 24) of die 156 should apply a clamping pressure the same as the clamp 178 directly across from it on the other side. Each clamp 180 on end 157 of die 156 should apply a clamping pressure the same as the clamp 178 directly across from it on end 157′ of die 156. The clamps 178 and 180 are symmetrically arranged about the edges of lower die 156. Five clamps 178 are arranged along each side 155, 155′ directly across the die from one another. Three clamps 180 are mounted on end 157 directly across from three clamps 178 on end 157′.

Upper die 154 is substantially the same shape as upper die 16 described above. Upper die 154 includes additional features, however. First, it has a steam chamber 242 which is identical in construction with steam chambers 158 and 174. Second, upper die 154 includes locator pins 168 at its four corners which are received within locator pin holes 244 on lower die 156 when lower die 156 is moved underneath upper die 154 and the two dies are urged together. Third, a channel or groove 246 (FIGS. 22 and 32) extends virtually completely around the periphery of the raised portion 248 of upper die 154. The purpose of channel 246 will be explained below.

Since the equipment used in the third process has been substantially described, the process will be explained in detail. FIrst, stretch clamp assembly 220 is retracted to the position shown in FIG. 25*a*, and all clamps 178 and 180 are unclamped (FIG. 22). A sheet of fabric 250 is placed overlaying lower die 156 with the sheet extending over the apron portion 218 around the lower die and overlaying horizontal web 224 (FIG. 25*a*). A small piece of "hinge38 fabric 250*a* is laid over upholstery 250 at the junction of the seat and back (shown hidden in FIG. 29). This reinforces the upholstery 250 at this juncture and helps prevent it from bunching when the overall cushion/upholstery assembly 288 is folded forward on itself during handling. Fabric sheet 250 is open weave fabric (woven or nonwoven) which has been coated on its upper surface (i.e., the surface facing upper die 152 when the fabric is placed on lower die 156) with one of the adhesives described above.

After the fabric is in position on lower die 156, clamps 178 and 180 are clamped (FIGS. 24 and 25*b*). Stretching clamp assembly 220 is then activated and retracted away from lower die 156 to stretch the fabric (FIG. 25*c*). The clamping force of clamps 180 should be insufficient to fixedly clamp the edge of fabric 250 between channels 230 and 232. Instead, a limited slippage between the two channel members should be allowed. It has been found that the two channel members 230 and 232 when clamped as shown in FIGS. 25*b* and 25*c* force the fabric to travel in a tortuous path between the clamped channel members and increases the drag on the fabric as it is being stretched.

After the stretching clamp assembly has been activated, a topped layer 252 of unskinned, uncoated foam is laid over fabric sheet 250. A scrim of polyester fabric (not shown) is then placed atop topper layer 252.

With the three layers in position, upper die 152 is urged toward lower die 156 and stops at the "controlled distance38 between the two dies described previously, determined by adjustable spacer stops 168*a*. While upper die 152 is being lowered over a 2 or 4 second time period, low pressure and low temperature steam approximately 210 to 212 degrees F. is injected into steam chamber 174 and emerges through openings 176 to soften fabric sheet 250. The steam is injected for about 10 seconds. When the upper die reaches the controlled distance, the low temperature, low pressure steam is turned off, and a high temperature, high pressure steam is injected into steam chamber 158 to shape the fabric and the foam and melt the adhesive between the two layers. The high temperature steam is about 248 degrees F. in the tool (i.e., as measured within the upholstered cushion being manufactured) and emerges from a superheater (not shown) adjacent the tool at a temperature of about 450 degrees F. The high temperature steam is injected into the cavity between the two dies for about 1 to 12 seconds. After the steam is injected, the two dies are separated and a vacuum is drawn for about 5 to about 20 seconds through the lower die to cool the fabric and the foam as the upper die is raised. After the upper die is raised, the uncoated scrim fabric is removed whereupon lower die 156 is rolled across rails 118 (FIG. 22) via a screw drive (not shown) to a position underneath upper die 154. The use of a screw drive enables one to positively locate lower die 156 without the need for stops.

Next, two core foam layers 254 and 256 (FIGS. 27 and 28) comprising the foam core 258 are placed within the configured upholstery body made of topping layer 252 and fabric sheet 250. Core foam layers 254 and 256 are aleady bonded together, and may be made of foams having different densities. However, core foam layer 254 is larger in area than core form 256, crating an overhanging edge 260 (FIGS. 27 and 28) around the periphery of layer 54.

Foam core 258 is coated on both its upper and lower surfaces with an adhesive of the type described above, and it is placed within lower die 156 with layer 254 placed overlaying topping layer 252 (FIG. 34). The size of the cavity within the shell formed by sheet 250 and topping layer 252 is of such dimensions that overhanging edge 260 will fold over the peripheral edges of foam layer 256 (FIG. 34) and between the edges of layer 256 and topping layer 252. The memory of overhanging edge 260 will force topper layer 252 deeper into the deep, rounded edge portions 262 and rounded side portions 264 of lower die 156. This enhances the definition and shape of the edges of the cushion manufactured by the process. The combined thickness of fabric 250, topping layer 252 and foam core 258 is thicker than the cavity formed between dies 154 and 156 when they are urged together so that the assembly is compressed and forces the fabric and foam to assume the shape of lower die face 172.

With foam core 258 in position, a seat backing sheet 266 is laid overlaying layer 256 in the seat area and extends outwardly over apron portion 218 of lower die 156 (FIG. 30). A similar backing sheet 266a overlays the back area. There is a gap between the two in the vicinity of the seat and back juncture. This makes the overall assembly 288 easier to fold during handling, with less tendency for the upholstery 250 to bunch up at the folded seat and back juncture, thus supplementing the junction of upholstery hinge 250a (FIG. 29).

With all of the cushion elements in position, a mounting ring assembly 268 (FIG. 31) is mounted on upper die 154. Mounting ring assembly 268 is held within channel 246 on upper die 154 (FIG. 32). Mounting ring assembly 268 includes two horseshoe-shaped members 270 and 272 which are roughly the shape of the perimeter of the completed chair cushion. Each of the horseshoe-shaped members 270 and 272 has a plurality of studs 274 and snap-fit fasteners 276 around its periphery. The studs, snap-fit fasteners and the mounting ring assembly secure the completed cushion to a chair in a manner to be described below. The two horseshoe elements 270, 272 are mounted in channel 246 on upper die 154 with the studs and snap-fit fasteners projecting into channel 246, and with the flat bottom face 278 (FIG. 33) of each of the two horseshoe elements 270, 272 facing downwardly toward lower die 156. Horseshoe elements 270, 272 are held within channel 246 by releasable clamping means associated with the upper die. Such clamping means may include vacuum suction holders, a releasable mechanical holding apparatus which grips studs 274 or an interference fit of horseshoe elements 270, 272 into channel 246.

The flat bottom face 278 of each of the two horseshoe elements 270, 272 is coated with a heat sensitive adhesive, preferably an adhesive identical to the granular heat adhesives described above. With the mounting ring assembly on upper die 154 and the fabric and foam layers on lower die 156, upper die 154 is lowered toward lower die 156 which is located at the left hand station as viewed in FIG. 22. The two dies are held at the controlled distance described above, again by the same type of adjustable stops 168a on upper die 154, and steam is injected from upper die 154 through steam chamber 240 at about 240 degrees F. as measured within the cushion itself. The steam is injected for about 5 to about 20 seconds. The steam melts the adhesive between backing sheet 266 and layer 256, between layer 254 and topping layer 252, and also between the flat face 278 of each of the horseshoe elements and backing sheet 266 so that the assembly is firmly adhered together.

After the steam is turned off, the vacuum is again drawn through the lower die of about 20 to 50 seconds to cool the completed part to a temperture where it can be handled manually. The completed cushion is then removed from lower die 154 and placed in a cooling and trimming fixture 280 (FIG. 36).

Cooling and trim fixture 280 includes a die 282 which has the shape of the completed cushion. Die 282 includes a plurality of openings 284 through its upper surface, and means for drawing a vacuum through openings 284. With the vacuum being drawn through die 282, the completed, upholstered cushion will be dried and cooled further. While the cushion is being cooled and dried, a cutting bar 285 with serrated teeth is lowered onto die 282 and severs the excess peripheral fabric 286 (FIG. 29) from the completed cushion 288 along an imaginary dotted line 290, leaving a web 292 of fabric along the periphery of upholstered cushion 288.

Cutting bar 285 is supported by a frame 292 above die 282. Four hydraulic cylinders 294 are supported from the upper part of frame 292, and a platform member 295 is suspended from hydraulic cylinders 294. In turn, a plurality of legs 296 depend downwardly from platform member 295 and support cutting bar 285. When cylinders 294 are actuated, cutting bar 285 will move toward or away from die 282. Preferably, a resilient cutting surface 297 is placed on die 282 where cutting bar 285 makes contact so as not to dull the teeth on the cutting bar.

After upholstered cushion 288 is trimmed and cooled, web 292 is folded underneath upholstered cushion 288 and stapled by staples 291 (FIG. 33) to mounting ring assembly 268. Upholstered cushion 288 can be snap-fit onto a chair shell 298 (FIG. 35). Chair shell 298 includes a plurality of openings 299 to receive studs 274 and a plurality of openings 300 to receive snap-fit fasteners 276. The distance between each pair of openings 299 and 300 should be no greater than the distance between each paired stud 274 and snap-fit fasteners 276. With the plurality of openings 299 and 300 around the periphery of a chair shell 298 corresponding to the spaced locations of studs 274 and snap-fit fasteners 276 around the periphery of mounting ring assembly 268, upholstered cushion 288 can simply be snapped into place on a chair shell.

In the third alternative embodiment, therefore, a very fast, economical process is employed whereby an upholstered, breathable chair cushion can be manufactured very quickly with deep, sculpted effects on it. The entire cushion can be snapped into place on a chair shell. There is no need for buttons or tufts or other expensive, manual means for attaching the cushion and creating the sculpted effects. The entire cushion can be made and installed with relatively few workers.

While several embodiments of the present invention have been shown and described, other embodiments will become apparent to those of ordinary skill in the art. Such embodiments are to be construed as included within the scope of the appended claims unless their claims expressly state otherwise.

The embodiments of the invention in which an exclusive property or priviledge is claimed are defined as follows:

1. A process for manufacturing upholstered, sculptured cushions, comprising:
   providing a first die with sculpted effects thereon;
   providing a second die, said two dies being movable toward each other to form a cavity between them;
   placing a non-preformed sheet of upholstery fabric between said dies;
   providing non-preformed, foam cushion means having thickness such that the combined thickness thereof with said upholstery fabric is greater than the distances between said dies in said cavity when they are in their closest position;
   locating air permeable adhesive means between said cushion and said upholstery;
   placing said cushion between said fabric and said second die;
   urging said dies together to compress said cushion in said cavity thereby forcing said fabric and cushion to conform to the shape of said first die;
   injecting hot vapors into said cavity to shape said cushion and said fabric.

2. The process of claim 1 in which said adhesive means is a heat activatable adhesive which is activated by said hot vapors and which, when activated and allowed to cool, helps said upholstery and cushion hold the shape imparted by said first die.

3. The process as recited in claim 2 wherein said adhesive means comprises a finely divided thermoplastic material which melts when exposed to said hot vapors.

4. The process as recited in claim 2 wherein said adhesive means comprises a spray hot melt, sprayed on in a web-like fashion to leave the adhesive layer air permeable.

5. The method of claim 4 wherein said adhesive means comprises a solvent based sprayable adhesive sprayed on in a web-like fashion to leave said adhesive layer air permeable.

6. The process as recited in claim 2 wherein said adhesive is coated on said cushion at about 1.5 to about 8 grams per square foot.

7. The process as recited in claim 6 wherein said adhesive is applied at about 2.5 to about 3.5 grams per square foot.

8. The process as recited in claim 7 wherein said adhesive is a finely divided powder with a grain size of between about 80 and about 700 microns.

9. The process as recited in claim 8 wherein said adhesive has a grain size of between about 500 and about 700 microns.

10. The process as recited in claim 2 wherein said cushion comprises a thin topping layer of foam whereby when said dies are urged together, a configured body of upholstery and topping foam is formed.

11. The process as recited in claim 10 which further includes coating a second cushion of foam on one side with said adhesive material;
    placing said second cushion into said shell with said one side of said second cushion against said topping layer;
    providing a third die which is movable toward said first die to form a cavity larger than said cavity between said first and second dies;
    said second cushion and shell having combined thicknesses greater than the distances between said first and third dies when they are closed to one another;
    forcing said first and third dies toward each other to form said cavity, and injecting hot vapors into said cavity to shape said shell and second cushion and to melt said adhesive to bond said second cushion and shell together.

12. The process as recited in claim 11 which further includes coating said second cushion on both sides with said adhesive and positioning a backing member over the other side of said cushion before said first and third dies are brought together and vapors injected.

13. The process as recited in claim 11 which further includes suspending said second and third discs beside each other above said first die, and moving said first die from under said second die after forming said configured body to under said third die for bonding said second cushion to said configured body.

14. The process as recited in claim 11 which further includes forming said second cushion from a plurality of pieces of foam with different densities.

15. The process as recited in claim 1 which further includes having the edges of said sheet extend beyond said cavity, and retarding the movement of said edges toward said cavity as said cushion forces said fabric to conform to the shape of said first die, whereby wrinkling of said fabric is minimized.

16. The process as recited in claim 15 whereas the movement of fabric edges is retarded by positioning a ring around the edges of said fabric and forcing said ring toward one of said dies.

17. The process as recited in claim 16 which includes dividing said ring into segments, each comprising a separate clamp, and applying a selected amount of force to each ring segment so as to allow fabric to slide under at least one ring segment at a rate different from under another ring segment.

18. The process as recited in claim 1 which further comprises drawing air into said cavity from one side of said cushion so as to cool said upholstered cushion.

19. The process as recited in claim 18 in which providing and placing said cushion means comprises placing two foamed cushions between said dies, one overlaying the other, with said upholstery fabric being placed over one of said two cushions, and coating the one cushion next to said upholstery fabric on both sides with said adhesive.

20. The process as recited in claim 19 which further includes providing said one cushion with a density lower than the density of the other cushion.

21. The process as recited in claim 20 which further includes placing a backing layer of permeable fabric material between said second die and said other cushion, and coating the side of said other cushion facing said backing layer with said adhesive.

22. The process as recited in claim 19 which further includes precarving at least one of said cushions with sculpted effects corresponding to the sculpted effects on said first die.

23. The process as recited in claim 22 wherein the other cushion is precarved on its surface facing said first die, whereby said one cushion and upholstery fabric is forced by said sculpted effects on said first die into the precarved effects on said other cushion.

24. The process as recited in claim 18 wherein said air is drawn through said cavity for about 40 to 80 seconds.

25. The process as recited in claim 18 wherein said hot vapors include steam at a temperature of at least about 230 to about 240 degrees F.

26. The process as recited in claim 1 in which one of said dies includes a steam chamber;
preheating said steam chamber;
and providing a plurality of openings through said steam chamber and said one die, said hot vapors comprising steam injected into said steam chamber and passing through said plurality of openings.

27. The process as recited in claim 26 wherein said steam openings are located at spaced locations across the entire surface of said one die in said cavity.

28. The process as recited in claim 1 wherein said hot vapors have a temperature of at least about 230 to about 240 degrees F. and are injected into said cavity for about 2 to 35 seconds.

29. The process as recited in claim 28 wherein said adhesive means has an initial melting point of about 190 to about 215 degrees F.

30. The process as recited in claim 1 which further includes preheating said dies so as to minimize condensation of said vapors in said dies.

31. The process as recited in claim 1 which further includes coating a mounting ring assembly with an adhesive, positioning said mounting ring assembly between said dies with said fabric and cushion means, and urging said dies together, whereby said mounting ring assembly will adhere to said cushion and can be used to mount said upholstered cushion to a chair.

32. The process as recited in claim 31 further including providing said mounting ring with snap-fit fastening means to fasten said upholstered cushion to a chair.

33. The process of claim 1 in which said adhesive means is a heat activatable adhesive which is activated by said hot vapors;
said process further including drawing a vacuum from one side of said cushion after said hot vapor has been injected so as to cool said upholstered cushion, whereby said adhesive is set and helps said upholstery and cushion hold the shape imparted by said first die.

34. A process for manufacturing upholstered, sculpted cushions, comprising:
providing a first die with sculpted effects thereon;
providing a second die;
coating at least one side of a foam cushion with a heat sensitive, air permeable adhesive;
placing said cushion between said dies with said one side facing said first die;
placing a sheet of upholstery fabric on said one side of said cushion;
providing a peripheral retaining ring and positioning said ring on said fabric such that said ring forces the edges of said fabric toward one of said dies;
urging said dies toward each other, forming an enclosed space between said dies having generally the configuration of the completed upholstered cushion;
injecting hot vapors into said enclosed space and applying suction to remove said vapors after they have contacted said cushion assembly, said vapors being of a sufficient temperature to activate said adhesive to bond said fabric to said cushion and shape said cushion, said fabric and cushion being impressed with said sculpted effects and shaped by said dies, and said peripheral retaining ring allowing limited travel of fabric into said space, preventing wrinkling of excess fabric in said space.

35. The process as recited in claim 34 wherein said hot vapors are injected for about 2 to 35 seconds.

36. The process as recited in claim 35 wherein said hot vapors include superheated steam.

37. A process for manufacturing upholstered, sculpted cushions, comprising:
providing a surface with sculpted effects thereon;
placing non-preformed upholstery fabric on said surface;
placing non-preformed, foam cushion means overlaying said fabric;
providing air permeable adhesive means between said fabric and said cushion means;
compressing said cushion means against said fabric to force said cushion and fabric to assume the shape of said surface;
injecting hot vapors into said fabric and cushion means to shape them to the sculpted shape of said surface.

38. The process as recited in claim 37 wherein said adhesive is a granular adhesive which melts when said vapors are injected.

39. The process as recited in claim 38 wherein said adhesive has a melting point of about 190 to about 215 degrees F.

40. The process as recited in claim 38 which further includes injecting cool vapors into said fabric and cushion means after said hot vapors are injected to cool said cushion.

41. A process for manufacturing upholstered seat cushions, comprising:
providing a first die having the shape of one side of a seat cushion;
providing a second die having the shape of the other side of a seat cushion;
positioning a plurality of retainer elements around one of said dies;
coating a cushion material with adhesive;
placing a layer of fabric and cushion material overlaying each other between said dies;
urging said dies toward each other;
urging said retainer elements toward one or the other of said dies so as to retain a portion of said fabric between each of said retainer elements and one of said dies; and
applying selected pressure to each of said retainer elements to allow fabric to slide at controlled amounts between each retainer element and the die against which it is urged.

42. The cushion manufacturing process as recited in claim 41 wherein said retainer elements comprise clamping means positioned around one of said dies.

43. The cushion manufacturing process as recited in claim 42 further including mounting at least one of said clamping means on a movable support, embracing a portion of said upholstery fabric between said one clamping means and said movable support, moving said support and said one clamping means away from said one die so as to stretch said fabric before said dies are urged toward each other.

44. A process for manufacturing upholstered seat cushions, comprising:

providing a first contoured die;
providing a second die;
placing a sheet of upholstery fabric between said dies;
placing a polymeric foam layer overlaying said fabric, said foam layer being coated on both sides with a heat sensitive adhesive;
placing a fabric backing sheet over said foam layer, sandwiching said foam layer between said upholstery fabric and said backing sheet;
placing a mounting ring assembly around the periphery of said backing sheet, said mounting ring being coated with a heat activatable adhesive;
urging said dies together to form a cavity therebetween; and
injecting hot vapors into said cavity.

45. A process for manufacturing upholstered, sculptured cushions comprising:
providing a first die with sculpted effects thereon;
providing a second die, said two dies being movable towards each other to form a cavity therebetween;
placing a sheet of non-preformed upholstery fabric between said dies;
providing non-preformed, foam cushion means having thickness such that the combined thickness thereof with said upholstery fabric is greater than the distance between said dies in said cavity when they are in their closest position;
locating air permeable, heat activatable adhesive means between said cushion and said upholstery;
placing said cushion between said fabric and said second die;
urging said dies together to compress said cushion in said cavity, thereby forcing said fabric and cushion to conform to the shape of said first die;
injecting hot vapors into said cavity at a temperature and for a time sufficient to melt and activate said adhesive and to shape said cushion and said fabric, but not so long as to promote wicking of the adhesive away from its bond line between said upholstery and said cushion;
cooling said cushion and said fabric to freeze said adhesive.

* * * * *

UNITED STATES PATENT AND TRADEMARK OFFICE
CERTIFICATE OF CORRECTION

PATENT NO. : 4,718,153

DATED : January 12, 1988

INVENTOR(S) : Donald H. Armitage and Robert C. Angell

It is certified that error appears in the above-identified patent and that said Letters Patent is hereby corrected as shown below:

Column 1, Line 19:

"drawn" should be --draw--

Column 1, Line 43:

"cave" should be --carve--

Column 1, Line 56:

After "elastic" insert --stretch--

Column 3, Line 11:

"line XXIV-XXIV of Fig. 23" should be
    --line XXV-XXV of Fig. 24--

Column 3, Line 26:

"of" should be --to--

Column 4, Line 48:

"Hydrulic" should be --Hydraulic--

Column 4, Line 50:

"Lowe" should be --Lower--

UNITED STATES PATENT AND TRADEMARK OFFICE
CERTIFICATE OF CORRECTION

PATENT NO. : 4,718,153
DATED : January 12, 1988
INVENTOR(S) : Donald H. Armitage and Robert C. Angell It is certified that error appears in the above-identified patent and that said Letters Patent is hereby corrected as shown below:

Column 6, Line 50:

"of" should be --or--

Column 7, Line 59:

"it" should be --It--

Column 8, Line 6:

"This" should be --Thick--

Column 11, Line 20:

"groovse" should be --grooves--

Column 13, Line 47:

"chamber 58" should be --chamber 158--

Column 15, Line 41:

After "fabric is" insert --being--

Column 16, Line 8:

"FIrst" should be --First--

Column 16, Line 39:

"topped" should be --topper-

UNITED STATES PATENT AND TRADEMARK OFFICE
CERTIFICATE OF CORRECTION

PATENT NO. : 4,718,153

DATED : January 12, 1988

INVENTOR(S) : Donald H. Armitage and Robert C. Angell

It is certified that error appears in the above-identified patent and that said Letters Patent is hereby corrected as shown below:

Column 16, Line 44:

"distance38" should be --distance"--

Column 17, Line 10:

"crating" should be --creating--

Column 17, Line 12:

"54." should be --254.--

Column 18, Line 16:

"of" should be --for--

Column 20, Claim 11, Line 9:

"to" should be --on--

Column 20, Claim 13, Line 21:

"discs" should be --dies--

UNITED STATES PATENT AND TRADEMARK OFFICE
CERTIFICATE OF CORRECTION

PATENT NO. : 4,718,153

DATED : January 12, 1988

INVENTOR(S) : Donald H. Armitage and Robert C. Angell

It is certified that error appears in the above-identified patent and that said Letters Patent is hereby corrected as shown below:

Column 22, Claim 40, Line 32:

"claim 38" should be --claim 37--.

Signed and Sealed this

Ninth Day of August, 1988

Attest:

DONALD J. QUIGG

Attesting Officer

Commissioner of Patents and Trademarks